United States Patent
Earnshaw et al.

(10) Patent No.: US 9,281,929 B2
(45) Date of Patent: Mar. 8, 2016

(54) PROVIDING MOBILE-GUIDED DOWNLINK INTERFERENCE MANAGEMENT

(75) Inventors: Andrew Mark Earnshaw, Kanata (CA); Xin Jin, Waterloo (CA); Jianfeng Weng, Kanata (CA)

(73) Assignee: BlackBerry Limited, Waterloo, Ontario (CA)

( * ) Notice: Subject to any disclaimer, the term of this patent is extended or adjusted under 35 U.S.C. 154(b) by 135 days.

(21) Appl. No.: 13/980,262

(22) PCT Filed: Jan. 21, 2011

(86) PCT No.: PCT/CA2011/050037
§ 371 (c)(1),
(2), (4) Date: Oct. 4, 2013

(87) PCT Pub. No.: WO2012/097433
PCT Pub. Date: Jul. 26, 2012

(65) Prior Publication Data
US 2014/0024388 A1    Jan. 23, 2014

(51) Int. Cl.
| | |
|---|---|
| H04B 7/00 | (2006.01) |
| H04L 5/00 | (2006.01) |
| H04W 72/02 | (2009.01) |
| H04W 24/10 | (2009.01) |
| H04W 72/04 | (2009.01) |
| H04W 72/08 | (2009.01) |

(52) U.S. Cl.
CPC .............. *H04L 5/0073* (2013.01); *H04W 72/02* (2013.01); *H04W 24/10* (2013.01); *H04W 72/0413* (2013.01); *H04W 72/082* (2013.01)

(58) Field of Classification Search
USPC .............. 455/436, 437, 444, 447, 452.2, 453, 455/522, 524, 525, 63.1, 69
See application file for complete search history.

(56) References Cited

U.S. PATENT DOCUMENTS

| | | | |
|---|---|---|---|
| 7,180,877 B1 * | 2/2007 | Benveniste | 370/329 |
| 8,504,091 B2 * | 8/2013 | Palanki et al. | 455/522 |
| 9,008,030 B2 * | 4/2015 | Zhou | H04W 52/243 |
| | | | 370/329 |
| 2010/0197317 A1 * | 8/2010 | Sadek et al. | 455/452.2 |

(Continued)

FOREIGN PATENT DOCUMENTS

| | | |
|---|---|---|
| EP | 1217852 | 6/2002 |
| KR | 2007-0112932 | 11/2007 |

(Continued)

OTHER PUBLICATIONS

International Search Report and Written Opinion of the International Searching Authority issued in International Application No. PCT/CA2011/050037 on Aug. 30, 2011; 10 pages.

(Continued)

*Primary Examiner* — Dai A Phuong
(74) *Attorney, Agent, or Firm* — Fish & Richardson P.C.

(57) ABSTRACT

Systems and methods can be implemented on a user device and eNBs to manage downlink interference at the user device. The user device in a cell associated with a corresponding serving base station may receive interference from one or more interfering base stations. The user device can identify a preferred radio resource set in response to the detected interference and transmit a preferred radio resource indication to at least the serving base station in response to the detected interference. The preferred radio resource indication can be used for identifying the preferred radio resource set associated with the serving base station.

20 Claims, 10 Drawing Sheets

(56) References Cited

U.S. PATENT DOCUMENTS

| | | | |
|---|---|---|---|
| 2010/0290557 A1* | 11/2010 | Lee et al. | 375/295 |
| 2011/0003599 A1* | 1/2011 | Kanzaki et al. | 455/452.2 |
| 2011/0217985 A1* | 9/2011 | Gorokhov | 455/452.2 |
| 2011/0222525 A1* | 9/2011 | Kishigami et al. | 370/343 |
| 2012/0140657 A1* | 6/2012 | Wigren | H04L 25/0212 370/252 |
| 2014/0112281 A1* | 4/2014 | Lau | H04W 72/1231 370/329 |
| 2014/0341169 A1* | 11/2014 | Wilson et al. | 370/329 |

FOREIGN PATENT DOCUMENTS

| | | |
|---|---|---|
| WO | 2008/003815 | 1/2008 |
| WO | 2008/120159 | 10/2008 |
| WO | WO 2008/120159 * | 10/2008 |
| WO | 2009/047740 | 4/2009 |
| WO | 2009/129413 | 10/2009 |
| WO | 2010/105231 | 9/2010 |

OTHER PUBLICATIONS

NTT DoCoMo; "Physical Channels and Multiplexing in Evolved UTRA Downlink"; 3GPP TSG RAN WG1 Ad Hoc on LTE (R1-050590); Sophia Antipolis, France; Jun. 20-21, 2005; 24 pages.

Extended European Search Report issued in European Application No. 11856269.3 on Jul. 15, 2014; 7 pages.

Office Action issued in Canadian Application No. 2,832,929 on Dec. 9, 2015; 4 pages.

* cited by examiner

… (1) …

PROVIDING MOBILE-GUIDED DOWNLINK INTERFERENCE MANAGEMENT

CLAIM OF PRIORITY

This application is a U.S. National Stage of PCT/CA2011/050037 filed on Jan. 21, 2011.

TECHNICAL FIELD

This invention relates to wireless communications and, more particularly, to managing mobile downlink interference.

BACKGROUND

Communication networks include wired and wireless networks. Example wired networks include the Public Switched Telephone Network (PSTN) and the Ethernet. Example wireless networks include cellular networks as well as unlicensed wireless networks that connect to wired networks. Calls and other communications may be connected across wired and wireless networks.

DESCRIPTION OF DRAWINGS

Like reference symbols in the various drawings indicate like elements.

DETAILED DESCRIPTION

The present disclosure provides for systems, methods, and apparatuses relating to wireless communications and, more particularly, to managing mobile downlink interference. Mobile electronic devices operating in a cell of a serving base station that experience interference from neighboring base stations and/or other sources operating in substantially similar spectrum can alert the base stations of such interference by providing reports to the base stations. The reports may include an indication to utilize a preferred radio resource set or subset by providing a preferred radio resource set indication to the serving base station. Serving base stations can prescribe one or more preferred radio resource subsets for the mobile electronic device based on the received indication. Further, the user device can send the report with an identified power transfer limit indication to the interfering, neighboring base stations. The interfering base stations can adjust the power levels at which they are transmitting on a particular radio resource based on the power transfer limit indication received in the report.

By providing an indication of interference to the base stations from the mobile electronic devices directly, user devices operating within a cell can manage interference as the devices detect the interference. For example, the interference coordination could be fast and effective and therefore the mobiles in the inter-cell interfering zone could have a better downlink user throughput. Similarly, the devices can manage interference by defining an acceptable level of interference before requesting to use a particular radio resource set. This feature provides the added benefit of resource allocation management efficiency by allocating preferred resource sets to user devices that actually experience an undesirable level of interference, even if the user device is being operated in a cell region outside of a cell edge (i.e., in a non-cell-edge region). As for the base stations, some implementations may include improved downlink throughput due to this mobile-guided interference coordination as it is expected that the mobiles (likely the cell-edge mobiles) suffering from the interference will report and trigger the interference coordination. If cells are heavily loaded but there are no mobiles complaining, the interference coordination may not be executed. Some implementations may include no heavy communication with neighboring evolved Node Bs (eNBs) on the potentially outdated load information, resulting in better scheduling and thus better downlink throughput and/or simplified eNB scheduling as mobiles share some part of the resource allocation work by specifying a preferred set of radio resources to use. Other advantages will be readily apparent from the following disclosure, drawings, and claims.

Figure 1:
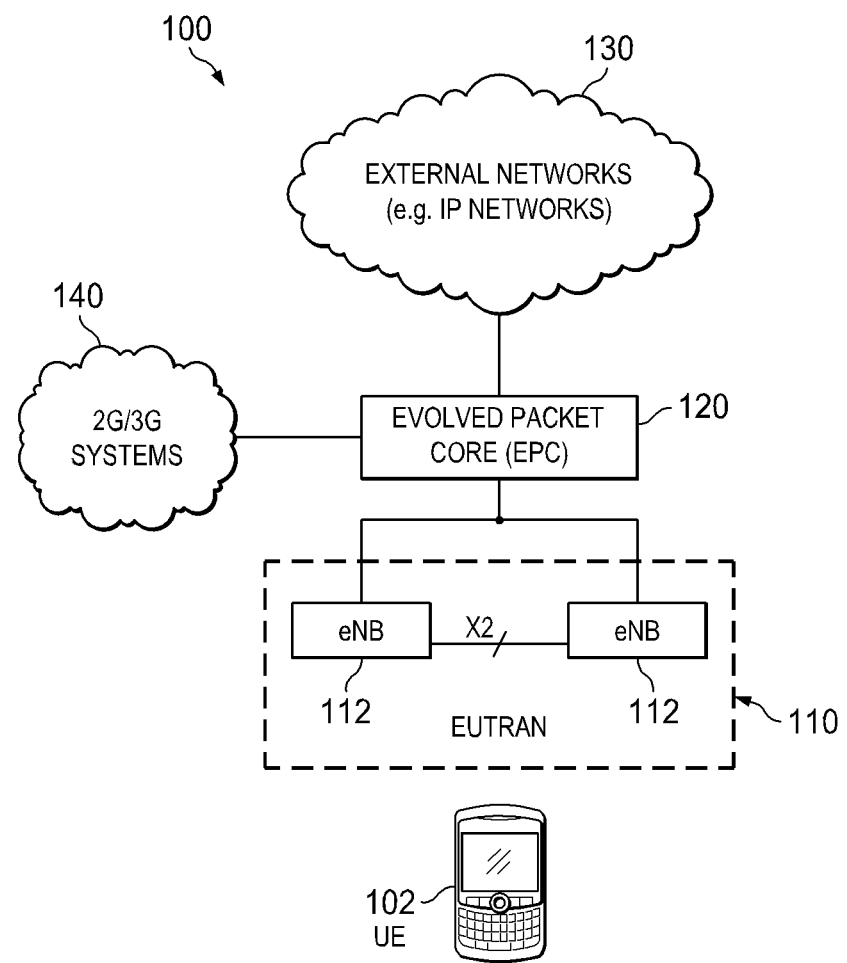
FIG. 1 is a schematic representation of an example wireless cellular communication system based on 3GPP long term evolution (LTE).

The mobile devices described above may be operated in a cellular network, such as the network shown in FIG. 1, which is based on the third generation partnership project (3GPP) long term evolution (LTE), also known as Evolved Universal Terrestrial Radio Access (E-UTRA). More specifically, FIG. 1 is a schematic representation of an example wireless cellular communication system 100 based on 3GPP long term evolution. The cellular network environment 100 shown in FIG. 1 includes a plurality of base stations 112. In the LTE example of FIG. 1, the base stations are shown as evolved Node B (eNB) 112. It will be understood that the base station may operate in any mobile environment including femto cell, pico cell, or the base station may operate as a node that can relay signals for other mobile and/or base stations. Base stations 112 can communicate with one or more mobile electronic devices 102 wirelessly. Base stations 112 may also communicate with each other by X2 communication interfaces, described in more detail below. The example LTE telecommunications environment 100 of FIG. 1 may include one or a plurality of radio access networks 110, core networks (CNs) 120, and external networks 130. In certain implementations, the radio access networks may be Evolved Universal Mobile Telecommunications System (UMTS) terrestrial radio access networks (EUTRANs). In addition, in certain instances, core networks 120 may be evolved packet cores (EPCs). Further, there may be one or more mobile electronic devices 102 operating within the LTE system 100. In some implementations, 2G/3G systems 140, e.g., Global System for Mobile communication (GSM), Interim Standard 95 (IS-95), Universal Mobile Telecommunications System (UMTS) and CDMA2000 (Code Division Multiple Access) may also be integrated into the LTE telecommunication system 100.

The EUTRAN 110 comprises EUTRAN evolved NodeBs (eNBs) 112, which are to be understood as the evolved base transceiver stations or base stations. The eNBs 112 communicate directly to the user equipment (UE) 102. UE 102 may be any mobile electronic device used by an end-user to communicate, for example, within the telecommunications environment 100. The UE 102 may be referred to as mobile electronic device, user device, mobile station, subscriber station, or wireless terminal. UE 102 may be a cellular phone, personal data assistant (PDA), smartphone, laptop, tablet personal computer (PC), or other wireless communications device. Further, UEs 102 may include pagers, portable computers, Session Initiation Protocol (SIP) phones, one or more processors within devices, or any other suitable processing devices capable of communicating information using a radio technology. UE 102 may communicate directly with a serving base station to receive service when UE 102 is operated within the cell associated with the corresponding serving station. UE 102 may also receive radio signals from base stations neighboring the serving base station.

Figure 2:
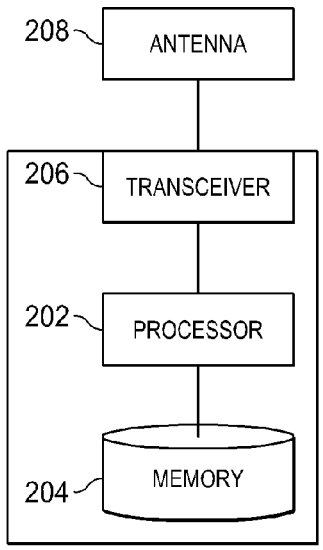
FIG. 2 is a schematic representation of the architecture of an example user equipment (UE).

Turning briefly to FIG. 2, each UE 102 may be any electronic device operable to receive and transmit wireless signals in the LTE telecommunication system 100. FIG. 2 is a schematic illustration of an example mobile electronic device 102. UE 102 may include a processor 202, a memory 204, a wireless transceiver 206, and an antenna 208. The processor 202 may comprise a microprocessor, central processing unit, graphic control unit, network processor, or other processor for carrying out instructions stored in memory 204. The functions of the processor 202 may include computation, queue management, control processing, graphic acceleration, video decoding, and execution of a sequence of stored instructions from the program kept in the memory module 204. In some implementations, the processor 202 may also be responsible for signal processing including sampling, quantizing, encoding/decoding, and/or modulation/demodulation of the signal. The memory module 204 may include a temporary state device (e.g., random-access memory (RAM)) and data storage. The memory module 204 can be used to store data or programs (i.e., sequences of instructions) on a temporary or permanent basis for use in a UE. The wireless transceivers 206 can include both the transmitter circuitry and the receiver circuitry. The wireless transceivers 206 may be responsible for up-converting a baseband signal to a passband signal or vice versa. The components of wireless transceivers 206 may include a digital to analog converter/analog to digital converter, amplifier, frequency filter and oscillator. The antenna 208 is a transducer which can transmit and/or receive electromagnetic waves. Antenna 208 can convert electromagnetic radiation into electric current, or vice versa. Antenna 208 is generally responsible for the transmission and reception of radio waves, and can serve as the interface between the transceiver 206 and the wireless channel.

UE 102 may receive interference from base stations neighboring a serving base station. Antenna 208 may receive interference from the base stations and/or other sources operating in substantially similar spectrums and provide signals including interference to the transceiver 206. Processor 202 may process the received signal, distinguishing between the interference and the desired signal from the serving base station. The level of interference can be determined by the processor 202. While the following discussion is directed toward inter-cell interference, the UE 102 may analyze other interference included from other sources operating in substantially spectrums without departing from the scope of the disclosure. In other words, when interference is discussed with respect to adjacent base stations, the disclosure covers interference from device operating in substantially similar spectrums. For example, a certain percentage of the interference (e.g., 99%, 95%, 90%) may be generated by the adjacent base stations while another percentage (1%, 5%, 10%) is may be generated by other devices. The level, or degree, of inter-cell interference may depend on the probability of radio resource collision (i.e. multiple base stations transmitting on the same radio resource) and the signal to interference and noise ratio (SINR) in the presence of a resource collision. The level of inter-cell interference may be determined by evaluating the background noise and/or the interference level of the cell-specific reference signals from a serving cell, i.e., serving base station. In a cell, the cell-specific reference signals may not be affected by the downlink traffic because the data resource elements are different from the resource elements carrying the cell-specific reference signals. In the presence of inter-cell interference, the background noise and interference level appearing at the resource elements carrying the cell-specific reference signals will increase, from which the UE 102 can determine if there is inter-cell interference. This increase in the background noise and interference level can be considered as an interference power level increase in the presence of inter-cell interference from interfering base stations relative to an interference floor in the absence of inter-cell interference. The interference floor is defined here as a reference power of total received noise and interference received from other than the interfering base stations. In the following, the increase above this interference floor is referred to as the relative interference quantity to indicate an interference power level change relative to the interference floor. Inter-cell interference detection techniques are described below, in connection with FIG. 6.

Based on the level of interference detected by the UE 102, the processor 202 may generate a report that may be transmitted to the serving base station as well as to neighboring base stations. The report may include a preferred radio resource indication (RRI). The RRI is transmitted to the serving base station to alert the base station that the UE 102 has detected interference and indicates a preferred radio resource set or subset. Here a radio resource set is defined as a combination of at least one of forthcoming time, frequency, and fixed beam locations which specify radio resources that can be used to carry downlink traffic. The processor 102 can also generate measurement reports of the detected interference level and transmit them via transceiver 206 to the serving base station to alert the serving base station that a radio resource indication is forthcoming. All or portions of the measurement report or information derived from the measurement report may be sent to the neighboring base stations to provide an estimated time of arrival of the RRI, which alleviates the neighboring base stations from having to constantly search for any RRI from UEs 102 not operating within their respective cells.

UE 102 may also provide power transfer limits in the report sent to the base stations. The power transfer limits may be used to instruct neighboring base stations to adjust power levels associated with particular radio resources to reduce interference detected by UE 102. For example, if UE 102 requests a particular radio resource subset corresponding to a frequency, the power transfer limit may inform the interfering base station to reduce power transmitted on the preferred frequency.

Returning to the illustration of FIG. 1, functionally, the UEs 102 may be used as a platform for different applications of communications. For example, the UEs 102 may be used for interacting with the cellular network by transmitting/receiving signals for initiating, maintaining or terminating the communications the end-user requests. The UE 102 may also include mobility management functions such as handovers and reporting the location, and in these the UE 102 performs as instructed by the cellular network. One exemplary function of the UE 102 may be to provide the user interface to the end-user so that applications such as voice call, data transmission or web browsing may be implemented.

In some implementations, UEs 102 may transmit in one or more cellular bands. One or multiple UEs 102 may be communicably coupled to the eNBs 112. In these cases, messages transmitted and/or received by UEs 102 may be based on a multiple access technology. In some implementations, the UEs 102 are configured to use orthogonal frequency division multiple access (OFDMA) technology or single carrier-frequency division multiple access (SC-FDMA) technology to communicate with the eNBs 112. In some other implementations, eNBs 112 may also accommodate UEs 102 using multiple access technologies such as time division multiple access (TDMA), frequency division multiple access (FDMA) and code division multiple access (CDMA).

The UEs 102 may transmit voice, video, multimedia, text, web content and/or any other user/client-specific content. On the one hand, the transmission of some of these contents, e.g., video and web content, may require high channel throughput to satisfy the end-user demand. On the other hand, the channel between the UEs 102 and eNBs 112 may be contaminated by multipath fading, due to the multiple signal paths arising from many reflections in the wireless environment. In some implementations, the UEs 102 and/or eNBs 112 may also be equipped with multiple antennas to take advantage of the multiple-input-multiple-output (MIMO) technology. MIMO technology may provide a process to utilize the multiple signal paths to reduce the impact of multipath fading and/or to improve the throughput. By using multiple antennas at the UEs 102 and/or eNBs 112, MIMO technology may enable the system to set up multiple parallel data streams on the same channel, thereby increasing the throughput of the channel. In short, UEs 102 generate requests, responses or otherwise communicate in different means with Enhanced Packet Core (EPC) 120 and/or Internet Protocol (IP) networks 130 through one or more eNBs 112.

A radio access network is part of a mobile telecommunication system which implements a radio access technology, such as UMTS, CDMA2000 and 3GPP LTE. In many applications, the Radio Access Network (RAN) included in a LTE telecommunications system 100 is called an EUTRAN 110. The EUTRAN 110 can be located between the UEs 102 and EPC 120. The EUTRAN 110 includes at least one or a plurality of eNBs 112. The eNB can be a radio base station that may control all or at least some radio related functions in a fixed part of the system. At least one eNB 112 or a plurality of eNBs 112 provide radio interface within their coverage area or a cell for the UEs 102 to communicate. eNBs 112 may be distributed throughout the cellular network to provide a wide area of coverage. The eNB 112 directly communicates to one or a plurality of UEs 102, other eNBs 112, and the EPC 120.

In some implementations, the eNB 112 may be in a one-to-many relationship with the UE 102, i.e., the eNB 112 may serve multiple UEs 102 within its coverage area, but each UE 102 may be connected to only one eNB 112 at a time. In some implementations, the eNB 112 may be in a many-to-many relationship with the UE 102, i.e., multiple UEs 102 are connected to multiple eNBs 112. The eNB 112 may be connected to other eNBs 112 with which a handover may be applied.

The eNBs 112 communicate between each other through X2 interfaces. One of the main functions of the X2 interface is for support of handover. The eNBs 112 may communicate with each other across the X2 interface to engage in interference management based on reports received from UE 102. For example, a serving base station may provide all or portions of a UE's measurement report or information derived from that measurement report to an interfering base station (or to all or at least some neighboring base stations) to provide an estimated time of arrival for a radio resource indication report. The UE 102 may transmit the measurement report when it detects a neighboring base station. The measurement report provides an estimated time of arrival for the radio resource indication report from the UE, though the transmittal of a measurement report does not necessarily mean that a radio resource indication report will be transmitted. The radio resource indication report is transmitted in certain instances where the UE 102 detects interference of a certain level. In addition, in certain instances, the radio resource indication report may be provided when the detected interference and/or noise levels are not too high such that the UE 102 cannot achieve a desirable connection with the serving base station.

In certain implementations, measurement reports, information derived from measurement reports, UE registrations, and/or UE registration updates are provided to neighboring base stations to provide an estimated time of arrival of the radio resource indication report, which the neighboring base stations may receive directly from the UE 102. In certain instances, the neighboring base stations may be constantly searching for the radio resource indication reports from user devices. This constant searching may waste base station resources. By providing an estimated time of arrival for the radio resource indication report, the serving base station provides an indication of a time interval during which the neighboring base station may search for a radio resource indication report.

In some aspects of operation, the UE 102 and the eNB 112 may operate in accordance with the following table:

TABLE 1

| Category | eNB | UE |
|---|---|---|
| RRI Configuration | 1. Time/frequency/fixed beam resource sharing.<br>2. RRI effective interval/offset (to indicate at what time the mobile reported RRI will be effective). | UE to understand RRI configuration. |
| RRI configuration transmission | Broadcast and/or UE specific | UE to understand RRI configuration. |
| UE registration to neighboring eNBs | 1. Based on the measurement report from a UE, determine if a UE registration notification to neighboring eNBs (so that neighboring eNBs can decode RRI reports from that UE) is needed. New X2 message. | Not applicable.<br>(A UE may send measurement reports anyway) |

TABLE 1-continued

| Category | eNB | UE |
|---|---|---|
| | 2. Renew the registration if cell info changes in a new measurement report from the UE or if a related timer expires. | |
| Interference presence determination | eNBs to transmit data active reference signals | 1. If transmitting data active reference signals from eNBs is not specified, UE's actions are: Measure the interference plus noise power and compare it with an interference floor.<br>2. If transmitting data active reference signals from eNBs is specified, UE's actions are: Employ data active reference signals (if they are present in downlink signal) |
| Interference floor determination | 1. If an eNB receives an RRI report from a neighboring UE requesting "no transmit power" on the specified RRI, the eNB avoids scheduling anything over the specified RRI.<br>2. eNBs can setup blank MBSFN (Multicast/Broadcast Single Frequency Network) subframes (for broadcasting data) to facilitate interference floor determination at UEs. | 1. UE can use RRI and neighbor-eNB transmit power change limit to request a short time interval for measuring an interference floor.<br>2. UE can make measurement at night for fixed-location devices.<br>3. UE can employ a theoretical thermal noise power calculation + UE's noise figure and use that sum as an interference floor.<br>4. If eNBs setup blank MBSFN subframes, UE's actions are: measure an interference floor during blank MBSFN subframes. |
| RRI report | Not applicable | Generate an RRI report based on<br>1. Channel quality and interference level<br>2. Possible neighbor-eNB transmit power change adjustment.<br>An RRI report has two pieces of info.<br>1. Preferred radio resource indicator.<br>2. Neighbor-eNB transmit power change limit.<br>UL PHY (Uplink Physical) channel to carry the RRI report.<br>1. New CDMA-type channel.<br>2. Embed RRI into uplink control channel.<br>3. New sounding reference signal-like channel.<br>4. Embed RRI into one of channel quality indicator levels (neighbor-eNB transmit power change limit is fixed to "no transmit power").<br>UL transmission of RRI reports can use uplink random access channel resources. |

TABLE 1-continued

| Category | eNB | UE |
| --- | --- | --- |
| RRI decode | Decode RRI reports from in-cell UEs as well as neighbor-cell UEs.<br>Neighboring eNBs need to track the time-of-arrival of RRI reports in case UEs are moving. | Not applicable |
| RRI based scheduling | For in-cell UEs that sent RRI reports, allocate resources for them in their specified RRI in the next available RRI interval.<br>For neighbor-cell UEs that sent RRI reports, allocate resources avoiding using their specified RRI or using them if the transmit power will be within the specified neighbor-eNB transmit power change. | Not applicable |
| Fixed beam together with RRI based scheduling | 1. eNB to define RRI one per beam basis.<br>2. eNB to employ a beam-switch technique together with RRI based scheduling for downlink interference coordination.<br>(Notes: An eNB with one cell ID can setup more than one fixed beam.<br>Using a beam-switch technique together with RRI based scheduling for interference coordination) | Not applicable. |

The above table is for illustration purposes only and UE 102 and eNB 112 may operate using some, none, or all of the identified elements without departing from the scope of the disclosure.

The eNB 112 may be the end point of the radio protocols towards the UE 102 and may relay signals between the radio connection and the connectivity towards the EPC 120. In certain implementations, the EPC 120 is the main component of a core network (CN). The CN can be a backbone network, which may be a central part of the telecommunications system. The EPC 120 can include a mobility management entity (MME), a serving gateway (SGW), and a packet data network gateway (PGW). The MME may be the main control element in the EPC 120 responsible for the functionalities comprising the control plane functions related to subscriber and session management. The SGW can serve as a local mobility anchor, such that the packets are routed through this point for intra EUTRAN 110 mobility and mobility with other legacy 2G/3G systems 140. The SGW functions may include the user plane tunnel management and switching. The PGW may provide connectivity to the services domain comprising external networks 130, such as the IP networks. The UE 102, EUTRAN 110, and EPC 120 are sometimes referred to as the evolved packet system (EPS). It is to be understood that the architectural evolvement of the LTE system 100 is focused on the EPS. The functional evolution may include both EPS and external networks 130.

Though described in terms of FIG. 1, the present disclosure is not limited to such an environment. In general, cellular telecommunication systems may be described as cellular networks made up of a number of radio cells, or cells that are each served by a base station or other fixed transceiver. The cells are used to cover different areas in order to provide radio coverage over an area. Example cellular telecommunication systems include Global System for Mobile Communication (GSM) protocols, Universal Mobile Telecommunications System (UMTS), 3GPP Long Term Evolution (LTE), and others.

Figure 3:
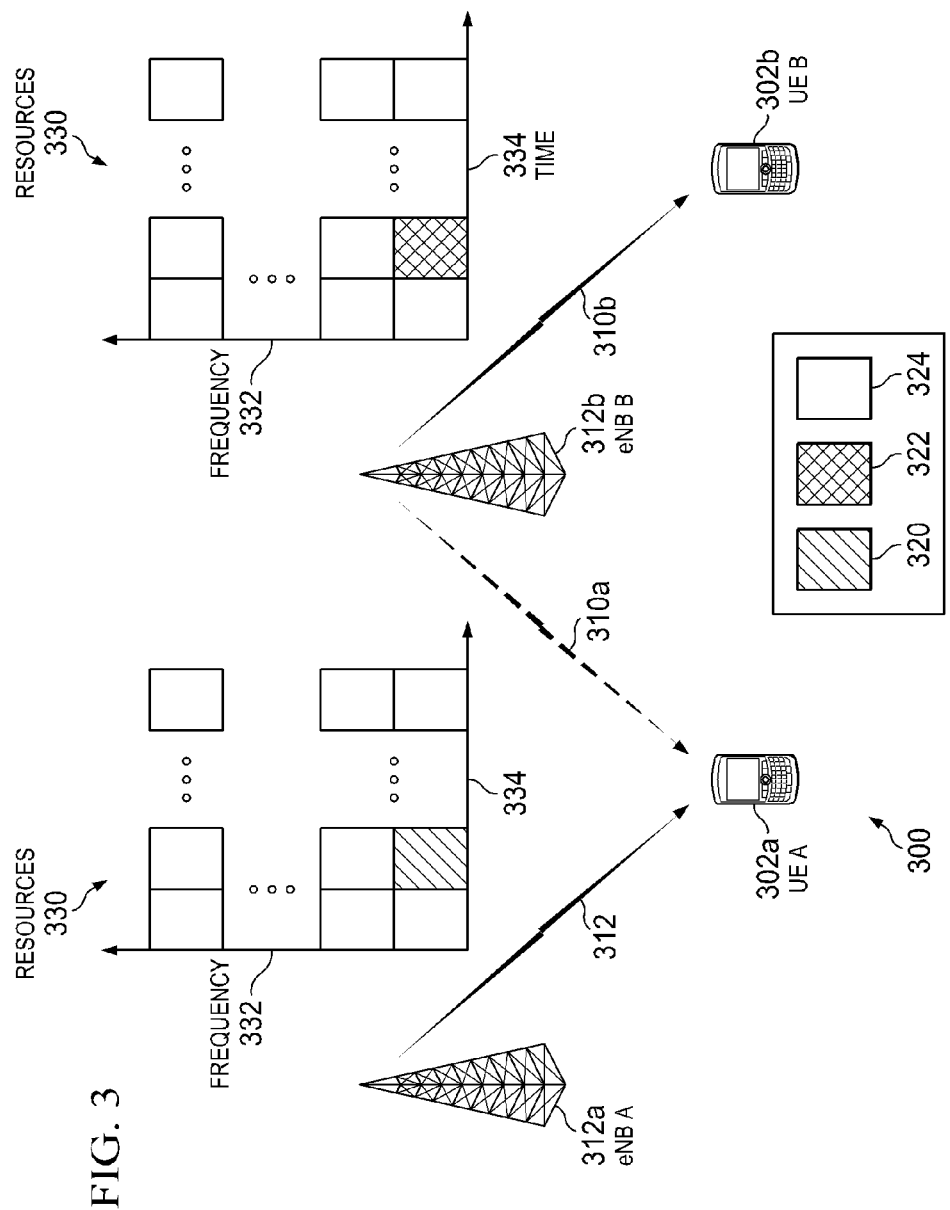
FIG. 3 is an example cellular network where inter-cell interference occurs in the cellular downlink.

FIG. 3 is an example cellular network where inter-cell interference occurs in the cellular downlink. A downlink, also known as the forward link in some implementations, is the link from a fixed location (e.g., a base station) to a mobile user (e.g., a UE). In an LTE system, the base station, e.g., the evolved Node B (eNB) communicates with the UE by transmitting/receiving wireless signals. The wireless signals to/from different UEs may cause interference with each other. Example interferences may include intra-cell interference, inter-cell interference, inter-symbol interference, inter-channel interference, etc. The interferences existing in a wireless environment can result in a decrease of reliability and/or data rate of communications. In the example illustrated in FIG. 3, UE A 302a is located in a cell served by eNB A 312a, i.e., eNB A 312a is the serving base station of UE A 302a. The eNB B 312b is a neighboring base station of UE A 302a serving a neighboring cell. UE B 302b is located in the neighboring cell served by eNB B 312b. Both UE A 302a and UE B 302b can receive downlink signals transmitted from eNB A 312a and eNB B 312b. In the particular implementation, UE A 302a receives a first downlink signal 312 from eNB A 312a and a second downlink signal 310a from eNB B 312b. UE B 302b receives a downlink signal 310b from eNB B 312b. It should be noted that eNB may simply send a downlink signal 310 by broadcasting. However, the downlink signal 310 seen by UE A 302a and UE B 302b may be different in appearance due to different transmission channel distortions.

In the LTE telecommunications system 300, the eNBs 312 can send downlink signals to multiple UEs using a multiple access technology. In some implementations, the multiple access technology used to transmit downlink signals is orthogonal frequency division multiple access (OFDMA). OFDMA is based on orthogonal frequency division multiplexing (OFDM), which is a frequency division multiplexing technology used as a multiple subcarrier modulation method. OFDM can modulate an information bearing signal, e.g., a sequence of symbols, on multiple orthogonal subcarriers. Different symbols modulated on different subcarriers may each be considered to experience a flat fading channel, i.e., the frequency response of a fading channel for each subcarrier can be considered flat, such that the information may be easier to decode at the receiver. In some practical implementations, OFDM uses fast Fourier transform (FFT) and inverse fast Fourier transform (IFFT) to alternate between time and frequency domain representations of the signal. The FFT operation can convert the signal from a time domain representation to a frequency domain representation. The IFFT operation can do the conversion in the opposite direction. The transmitter of an OFDMA system can use an IFFT block to create the time-domain signal to be transmitted. The data source may be fed to the serial-to-parallel conversion and further to the IFFT block. Each input for the IFFT block may correspond to a particular sub-carrier (or particular frequency component of the time domain signal) and can be modulated independently of the other sub-carriers. The downlink radio resources 330, e.g., frequency 332, and time 334, can be further divided into resource blocks. A frequency band and time slot can be associated with each of the resource blocks. Each resource block can further include multiple resource elements and each resource element may correspond to one complex-valued modulation symbol. In OFDMA, an eNB can allocate one or more resource blocks to a UE and send information to the UE via the allocated resource blocks. Telecommunications systems which use OFDMA technology often reuse the radio frequency band between neighboring base stations. Thus, in the LTE downlink, the radio resources 330 used by neighboring eNBs in neighboring cells may be overlapping. In such LTE cellular networks, if a UE is able to see downlink signals from more than one eNB, that UE may experience inter-cell interference when one of the neighboring eNBs schedules some downlink data in the same resource block(s) being used by the serving eNB to send data to that UE. In other words, the inter-cell interference may happen when there is a collision between the radio resources used by a serving eNB and those used by its neighboring eNBs. For example, in the particular implementation illustrated in FIG. 3, UE A 302a is served by eNB A 312a and UE A 302a is located in an area where it can receive a first signal 312 from eNB A 312a and a second signal 310a from eNB B 312b. UE B 302b is served by eNB B 312b and UE B 302b may be far away from eNB A 312a such that UE B 302b can only receive the downlink signal from eNB B 312b. Thus, for UE A 302a, eNB A 312a is a serving eNB and eNB B 312b is an interfering eNB. Serving eNB A 312a can send data to UE A 302a on a radio resource block 320. Similarly, interfering eNB B 312b can send data to UE B 302b on a radio resource block 322. Other resource blocks may be allocated to other UEs or unallocated. As shown in the example, the resource block 320 allocated to UE A 302a is on the same frequency band and time slot with the resource block 322 allocated to UE B 302b. As UE A 302a can see the downlink signals from both eNBs, UE A 302a may suffer from inter-cell interference when the received interference power of signal 310a from interfering eNB B 312b at the allocated resource block 322 is sufficiently large relative to the power of the received signal 312 from serving eNB A 312a on the same resource block 320. It is to be understood that the inter-cell interference 310a adds unwanted signals to the useful received signal 312, which may reduce the data rate and/or reliability of the communication link between eNB A 312a and UE A 302a. The degree of inter-cell interference may depend on the probability of the resource block collision, which is the case in the above example, and/or the signal to interference and noise ratio (SINR), i.e., the signal power divided by the summation of the interference power and background noise power.

Figure 4:
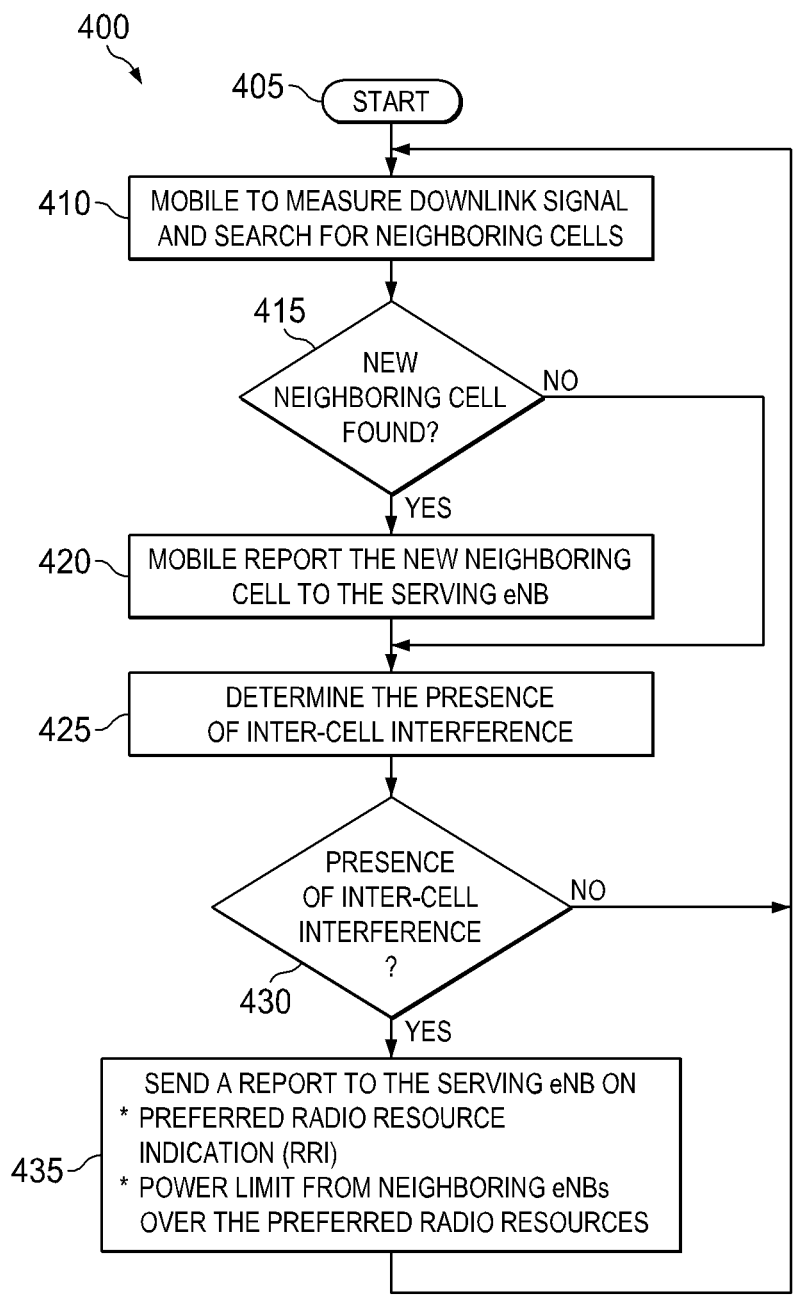
FIG. 4 is a flowchart illustrating an example method of downlink interference coordination at the UE.

FIG. 4 is a flowchart illustrating an example method 400 of downlink interference coordination at UE. Interference coordination may be a method used for mitigating the effect of interference. At a high level, the method 400 includes three high-level processes at the UE: (1) measure downlink signal, search for neighboring cells and send a measurement report to the serving eNB from steps 410 to 420; (2) determine the presence of inter-cell interference and background noise from steps 425 to 430; and (3) send a report to the serving eNB on the preferred radio resource indication (RRI) and transmit power change limit of the neighboring eNBs at step 435. The example method implemented by a UE starts at step 405. At step 410, the UE measures the downlink signal and searches for neighboring cells that may cause interference. In some implementations, the UE can periodically perform downlink radio channel measurements based on the reference symbols (RS), which are transmitted from the eNB along with the data symbols. Namely, the UE can measure the reference symbol received power (RSRP) and the reference symbol received quality (RSRQ). More illustrations on measuring downlink signals and searching for neighboring cells are given in the 3GPP LTE standard technical specification (TS) 36.214. At decisional step 415, the UE may determine whether a new neighboring cell is found. If yes, the UE can report the new neighboring cell by sending a measurement report to the serving eNB at step 420. Next, the UE continues to step 425 to determine the presence of inter-cell interference. If no new neighboring cell is found, the UE can proceed directly from step 415 to 425. It is to be understood that the UEs may be in the best position to determine the presence of inter-cell interference. If there is no UE in or around the edge of the cell, or present in zones which are not affected by interference from neighboring base stations, inter-cell interference may affect no UE and no inter-cell interference coordination may be performed. The determination of inter-cell interference at step 425 may not be based on the RSRP as the RSRP is an averaged power on the resource blocks that carry the RS and it contains both signal power and noise power. In some implementations, to detect the presence of inter-cell interference, the UE can monitor the background noise plus interference power level at the resource elements that carry cell-specific RS sent from a serving eNB. The UE can then compare the power level with an interference floor, with that interference floor having been previously determined in the absence of inter-cell interference. Within one cell, the cell-specific RS may not be affected by the downlink traffic as the data resource elements are different from the resource elements carrying the cell-specific RS. In the presence of inter-cell interference, the background noise plus interference power level appearing at the resource elements carrying the cell-specific RS may increase, from which the UEs can determine if there is inter-cell interference. Thus, by examining the background noise plus interference power level change relative to the interference floor on the cell-specific RS from a serving eNB, the UE may be able to know if there is a presence of inter-cell interference.

In some implementations, there are six possible frequency locations for cell-specific RS. Note that an eNB with multiple transmit antennas can use two of those frequency locations. Careful network planning could result in minimal frequency location collisions between neighboring cells. In an example non-synchronous network, there may actually be less chance of collisions in the cell-specific RS locations because the time locations of the reference symbols from different eNBs may be shifted randomly relative to each other. It is to be understood that the presence of the cell-specific RS of neighboring cells may not reflect an active data allocation in any resource blocks of neighbor cells. Therefore, detecting cell-specific RS of neighboring cells may not directly indicate the presence of inter-cell interference.

One example method of determining the presence of inter-cell interference is discussed below.

Given one of the resource elements that carries the cell-specific RS of a serving cell, the frequency domain received signal after the FFT operation at the receiver of a UE can be written as $$y(k)=h(k)\cdot x(k)+n(k)+i(k) \quad (1)$$

where k is a subcarrier index for the resource element of interest, h(k) is the channel frequency response at subcarrier k, x(k) is the transmitted RS and is known to the UE, n(k) is the background noise at subcarrier k, and i(k) is the inter-cell interference at subcarrier k. Here, the background noise power is considered as an interference floor, which is a reference power of total received noise and interference received from other than the interfering base stations. The background noise plus interference estimate can be calculated as $$z(k)=y(k)-\tilde{h}(k)\cdot x(k)=n(k)+i(k)+(h(k)-\tilde{h}(k))\cdot x(k) \quad (2)$$

where z(k) denotes the noise plus interference plus a residual term $(h(k)-\tilde{h}(k))\cdot x(k)$ which may result from a channel estimation error. Since the example implementation is focused on determining the inter-cell interference and background noise, for simplicity, it is assumed that the channel estimation has been done with good quality so that the residual term due to the channel estimation error can be omitted.

In some implementations when determining the presence of inter-cell interference, a short-term average power of z(k) within one resource block may be computed. The average could be over receive antennas, over several samples per resource block for each subframe (there may be more than one reference signal per resource block) and over several subframes. It is to be understood that due to the dynamic scheduling, the presence of interference may be bursty and may not be present in every subframe. Thus, an alternative method of determining the interference may be to perform the power averaging over several resource blocks within each subframe, and then check the averaged rate when the averaged power per subframe exceeds a threshold. In some implementations, a high rate may indicate a high likelihood that those resources are being affected by inter-cell interference. Next, the UE can compare the short-term average power with an interference floor at a common automatic gain control (AGC) reference point. The AGC is an adaptive module at the radio receiver in which the average output signal level can be fed back to adjust the gain to an appropriate level for a range of input signal levels. If the power difference is larger than a threshold, the presence of inter-cell interference can be declared. More discussions on determining the interference floor are provided in the illustration of FIG. 5.

In some implementations, a data active pilot may be added to facilitate the interference detection. Data active reference signals are similar to cell-specific reference signals (CSRS) scattered in each resource block and their sequences are known to any UE. However, unlike the CSRSs which are present all or at least some of the time, data active reference signals may be active only when there is a corresponding data transmission. From that view-point, data active reference signals are similar to UE-specific reference signals prescribed in 3GPP TS36.211 (Release-10) in the sense that they are present only on the resource blocks assigned for an active downlink transmission. In some implementations, a pseudo-random binary sequence may be used to generate data active reference signals for a cell at a given time slot and a given resource block. The state for the pseudo-random sequence generator may be re-initialized based on the cell ID, the time slot index and the resource block index. In that way, the data active reference signals are not UE-specific and could be known to any UEs, including neighboring cell UEs, provided those UEs can detect the cell ID and the slot index for a cell of interest. A threshold can also be defined to declare the presence of inter-cell interference. With data active reference signals, a UE can determine the received power level of a downlink signal from any neighboring cell by correlating the cell-specific known data active pilot sequence with the received signal in each resource block. If the received power level exceeds a threshold, the UE can declare the presence of inter-cell interference.

At step 430 of the example implementation, if the UE does not find the presence of inter-cell interference, it can go back to step 410 and continue to perform measurements of downlink signal and search for neighboring cells. If the presence of inter-cell interference is detected, the UE can proceed to step 435 where it sends a report to the serving eNB on the preferred radio resources to use in the next configurable time interval and the transmit power change limit for signals from the interfering eNBs over those preferred radio resources. The preferred radio resources may include frequency, time and beam locations (the UE location inside an area covered by an eNB antenna beam). In some implementations, the eNBs can have a predefined radio resource reuse pattern so that the preferred set of radio resources used by one eNB does not overlap with the ones used by the neighboring eNBs. The frequency resources here may be adjacent or distributed. The time locations may be one subframe or several subframes. The beam locations can be useful in some implementations where a cell has more than one fixed beam with each beam supporting UE receive diversity. An eNB can detect which beam a UE is in by examining the received power level from the UE at different receive antennas of each beam and/or triangulating that UE. A UE may also detect which beam it is in by checking its location. In some implementations, the UEs may send RRI reports to their serving eNB only when inter-cell interference is coordinated. A cell-edge UE, which can see downlink signals from more than one eNB, can track the power level of any inter-cell interference with respect to a background interference floor. If the power level increase due to inter-cell interference exceeds a threshold, the UE can send an RRI report to indicate its preferred radio resource.

Turning to the process of RRI report generation, at a high level, the RRI generated by the UE may be used to indicate: (1) preferred set of radio resources for the upcoming downlink transmission; and (2) transmit power change limit on the downlink signal from neighboring eNBs. The preferred radio resources can be specified as a combination of frequency, time, and/or beam locations. After a UE detects the presence of inter-cell interference, the UE may send an RRI report if it has an active downlink transmission and expects to maintain the transmission. Alternatively, the UE can check the channel quality indicator (CQI) value to determine if an RRI report is to be sent. In the LTE system, the CQI can be used by the UE to indicate the channel quality to the eNB. In some implementations, the CQI reported value is between 0 and 15, which indicates the modulation and coding scheme (MCS) at which the UE can operate for a specified error rate. For example, a UE may check the following to decide whether to send an RRI report. If a wideband CQI (e.g., the CQI of the entire frequency band of the downlink OFDMA signal) or subband CQIs (e.g., the CQI of the frequency band of a subset of resource blocks) of that UE is below a threshold (e.g., below the lowest CQI for a meaningful communication, which may suggest that no reliable downlink transmission is possible), and an absence of inter-cell interference can increase the CQI to the level for a reliable downlink transmission, the UE may send an RRI report. It is to be understood that the reported CQI in the RRI report should correspond to the absence of inter-cell interference. If reporting an RRI is not expected to help on improving the reliability of downlink transmission, the UE may choose not to send an RRI report. If the UE expects to use a higher MCS by avoiding the inter-cell interference in the resource sets supported by the serving eNB, the UE may send an RRI report.

For the transmit power change limit, if a UE can estimate the received interference level from neighboring eNBs, it may be able to determine the transmit power change limit (i.e., a limit on the transmit power change with respect to the current transmit power from neighboring eNBs) over the preferred radio resources to be used. For example, a UE can send a CQI together with an RRI to indicate an expected future interference power level reduction or to indicate how much a future interference power level increase that the UE can tolerate. In that case, one possible approach is to set the transmit power change limit less than or equal to 0 dB and apply this limit to all or at least some interfering eNBs that successfully detect the RRI report.

Figure 5:
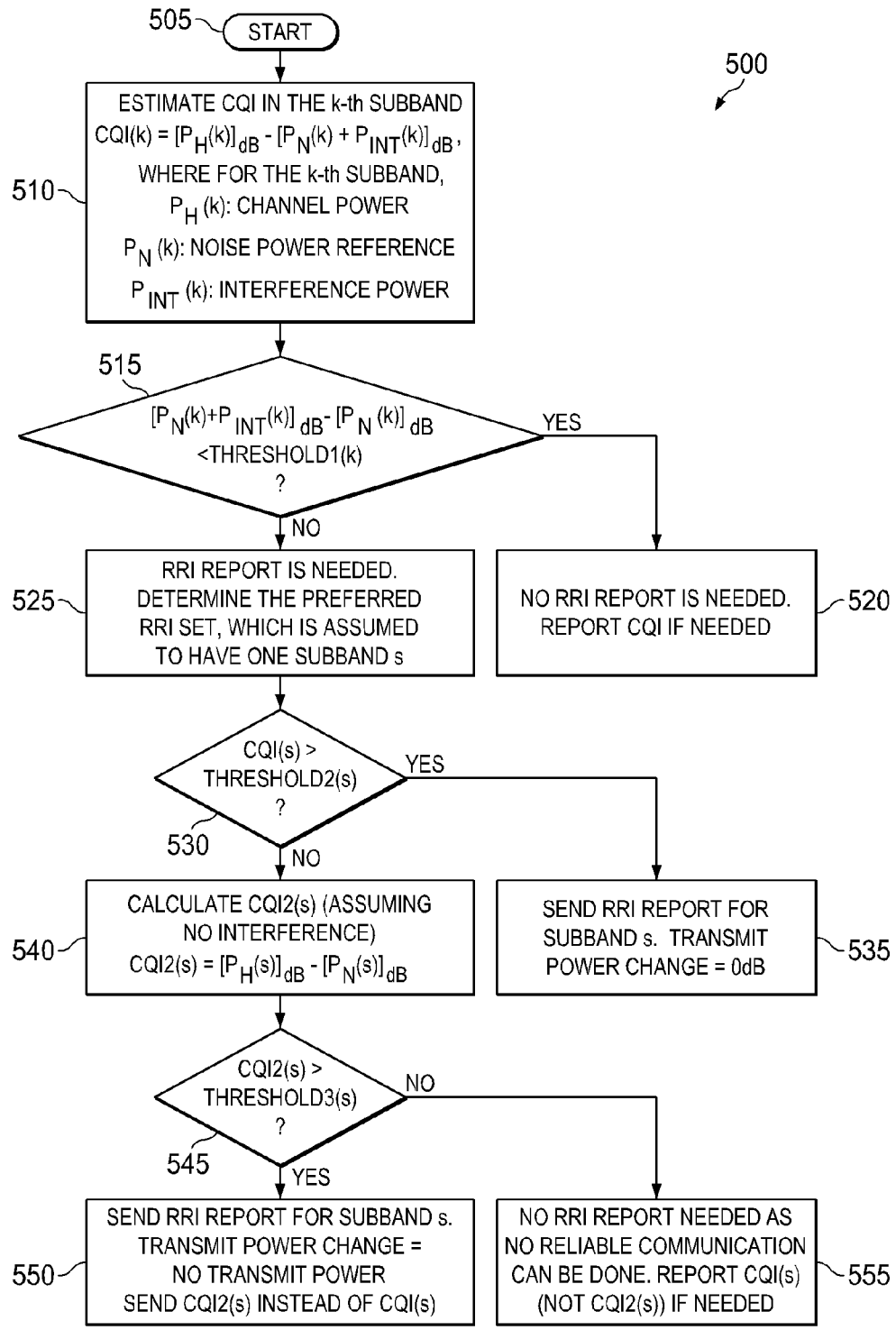
FIG. 5 is a flowchart illustrating an example method of generating a report regarding interference at the UE.

The following particular example method 500, as shown by the flowchart in FIG. 5, further illustrates the RRI report generation process. The method 500 starts at step 510. A UE may estimate a CQI in dB, for the $k^{th}$ subband as $$CQI(k)=[P_H(k)]_{dB}-[P_N(k)+P_{int}(k)]_{dB} \qquad (3)$$

where $[.]_{dB}$ denotes a representation in dB or logarithmic scale, $P_H(k)$ is the channel power for the $k^{th}$ subband, $P_N(k)$ is the noise power reference (i.e., an example interference floor), and $P_{int}(k)$ is the interference power. The interference power level, i.e., $[P_N(k)+P_{int}(k)]_{dB}-[P_N(k)]_{dB}$, is compared with a first threshold at decisional step 515. The channel power is defined here as the power of the desired signal from the serving base station. The interference power level is a relative interference quantity. If the interference power level is less than the first threshold, namely, threshold1(k), then the UE proceed to step 520 where no RRI report is to be sent and the CQI may be reported if appropriate. Otherwise, the UE proceeds to step 525. At step 525, an RRI report may be generated, for which the UE may determine the preferred radio resource set by evaluating the error performance. In this example, it is assumed that the preferred radio resource set has one subband, i.e., subband s. At decisional step 530, the CQI in subband s, CQI(s), is compared with a second threshold, namely, threshold2(s). If the CQI(s) is larger than a threshold2(s), the UE may proceed to step 535 where it sends an RRI report to select subband s with a transmit power change limit set to 0 dB, since a limit larger than 0 dB may trigger all or at least some neighboring cells to potentially increase their transmit power which is not desirable. Otherwise, the UE may further check a second CQI, i.e., CQI2(s) at step 440, where CQI2(s)=$[P_H(s)]_{dB}-[P_N(s)]_{dB}$, by assuming the interference power level can be reduced to 0 (i.e., no interference). At decisional step 545, the UE compares CQI2(s) to a third threshold, namely, threshold3(s). If CQI2(s) is larger than threshold3(s), the UE may proceed to step 550 where it sends an RRI report to select subband s with a transmit power change limit for neighboring cells set to a value corresponding to no transmit power. It should be noted that in this case, the UE may report CQI2(s) instead of CQI(s). Otherwise, this round of process ends at step 555 where no RRI report may be sent, since no reliable downlink communication may be done. The UE may still report CQI(s) if appropriate.

It should be noted that, in some implementations, the preferred radio resource indication may imply a radio resource reuse, which can include frequency reuse, time reuse, and antenna beam reuse. Further, frequency reuse is associated with the inter-cell interference experienced by the UEs (other UEs can still use freely other frequency resources until there is a complaint from neighboring cells). The radio resource reuse can also be a hybrid of reactive and proactive measures. The reuse may be triggered only when the inter-cell interference can be determined. In case the reuse is triggered, the available radio resources that can be used by interference-experiencing UEs may be shrunk to proactively avoid the potential inter-cell interference in the upcoming downlink data transmission.

In some implementations, the RRI report is handled in the physical layer of the LTE system to reduce the processing latency and computational complexity of decoding at neighboring eNBs. For example, the UE may use the following assignment of bits to carry indicators in the physical layer.

Number of bits for radio resource indicator (RRI): 4 bits, i.e., 4 bits can be used to indicate a preferred set of radio resources. A 3-cell radio resource reuse (e.g., a particular radio resource block is used once in every 3 cells) may use at least 2 bits while a 7-cell radio resource reuse may use at least 3 bits. By assigning 4 bits to RRI, more subsets of radio resources for UEs to select and/or a greater number of cells for radio resource reuse can be allowed. This may be useful as heterogeneous deployment mixes of macro and pico/femto cells become more prevalent.

Number of bits for the power change limit indicator (PCLI): 2 bits per cell for a maximum of two cells. The number of bits to indicate a transmit power change limit for one neighboring cell can be 2 bits. A transmit power change limit may be selected from one of the 3 options including −3 dB, 0 dB and 3 dB as well as one option to indicate no transmit power. Thus, 2 bits can represent those four possible levels. The maximum number of neighboring cells used in a transmit power change limit indication are 2 cells. It is assumed that a UE can see one serving cell and up to two strongest interfering cells (other cells can be ignored). The order of reporting can be in the same neighboring cell order as in the most recent measurement report sent to a serving eNB; hence no extra bits for ordering are required. If a UE cannot determine the number of interfering cells, the UE may report a transmit power change limit by assuming that the limit is applicable to all or at least some cells.

The RRI and PCLI may be carried by the physical layer channel using one or more of the following methods (or any combination thereof): (1) encode RRI and PCLI bits and then adopt code division multiple access (CDMA) technology to scramble and/or spread the encoded bits in addition to conducting the transmission within the allocated frequency resources. The spreading code can be a channelization/orthogonal code, e.g., a Walsh-Hadamard code, sent in one subframe with a low transmit power. For a particular UE, the scrambling code used to scramble the RRI reports can be a long scrambling code such as a Gold code used in WCDMA uplink. The long scrambling code may have an initial phase determined by a combination of the serving cell ID for that UE and the cell radio network temporary identifier (C-RNTI) assigned to the UE; (2) use an existing physical uplink control channel (PUCCH) format for a subframe or add a new PUCCH format to carry extra RRI and/or PCLI bits if a UE does not have any uplink grant for the subframe. Alternatively, include the RRI information in an uplink control information (UCI) embedded in a Physical Uplink Shared Channel (PUSCH) transmission, if the UE has an uplink grant for that subframe. It should be noted that such an embedded UCI may be difficult for a neighbor eNB to locate and extract. To circumvent that problem, a serving eNB may avoid scheduling PUSCH transmissions for a UE in the subframes in which the UE has an RRI reporting opportunity; (3) another alternative may be to encode RRI and PCLI bits separately and transmit them in a similar fashion as the sounding reference signal (SRS) transmission. Using this method, the RRI and/or PCLI transmission time may be reduced, sometimes to within one OFDM symbol interval; (4) it may also be possible to single out the PCLI bits and use the measurement report to send the PCLI bits.

Figure 6:
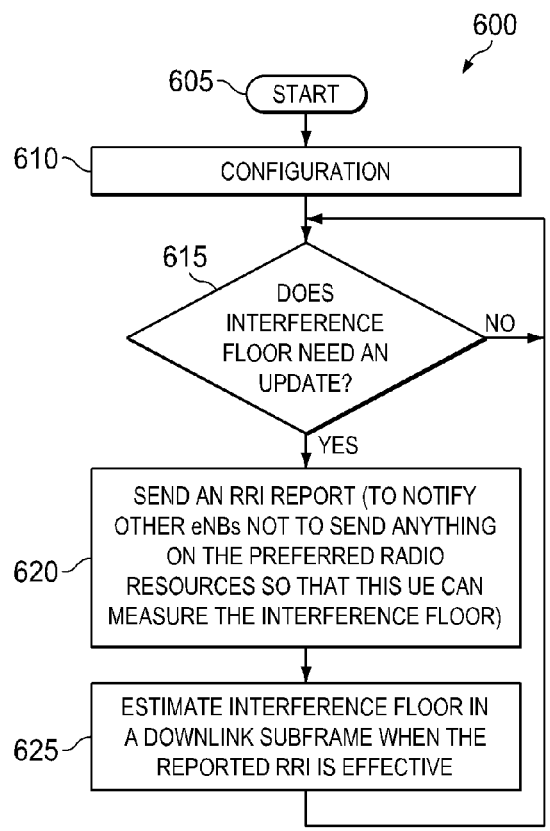
FIG. 6 is a flowchart illustrating an example method of estimating the interference floor.

Turning to the process of determining the interference floor, an example technique 600 is illustrated in FIG. 6. FIG. 6 is a process flow chart illustrating an example method of generating a report regarding interference at UE. At a high level, in the example method 600, the UE can use the proposed RRI and the associated power change limit to indicate a preferred resource set, over which the neighboring eNBs may not transmit anything for some time, e.g., the length of one subframe, to facilitate the interference floor estimation. The time period for the neighboring eNBs to be silent may be based on use. Returning to the illustration of FIG. 6, the method starts at step 605 and the UE configuration is conducted at step 610. At decisional step 615, the UE decides whether the interference floor may be updated. The UE can check whether an update is periodically executed. If an update is not executed, the UE may check again at the beginning of the next cycle. Otherwise, the UE proceeds to step 620 where it sends out an RRI report. As discussed above, the RRI report may contain two pieces of information: the RRI and the neighboring eNB transmit power change limit. In some implementations, for a first use of RRI report, a UE can specify a preferred radio resource and/or a transmit power change limit indication to notify neighboring eNBs to not increase, to allow an increase by a predetermined amount, or to decrease by a predetermined amount, their transmit power over the preferred radio resource. For a second use, a UE intending to estimate an interference floor can specify the neighboring eNB transmit power change limit to indicate no transmit power. Accordingly, when the RRI report is effective, the UE can proceed to step 625 where it may estimate the interference floor on the specified downlink subframe without interference from neighboring eNBs. Another round of interference floor estimation may start at the decisional step 615 if an update is executed.

The interference floor may also be estimated using one or more of the following methods: (1) for some fixed-location devices, the average power of the background noise can be measured when the network is not busy (e.g., during the late night), and the measurement can be used as the interference floor; (2) use cell null subcarriers to manage interference and facilitate the interference floor estimation, where null subcarriers are a small group of predefined, cell-independent, and no downlink transmission carrying subcarriers at a known time so that UEs in any cell may use those null subcarriers to estimate the interference floor.

Figure 7:
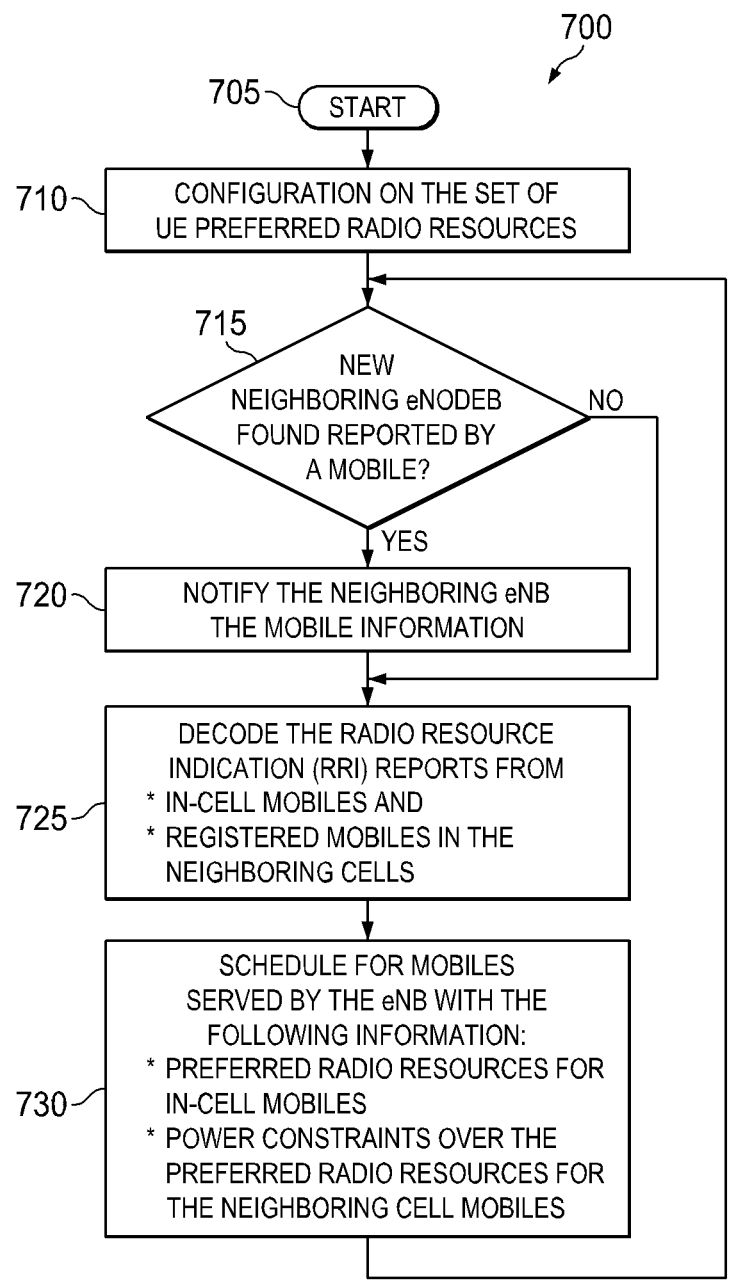
FIG. 7 is a flowchart illustrating an example method of downlink interference coordination at the base station.

FIG. 7 is a flowchart illustrating an example method 700 of downlink interference coordination at an eNB. At a high level, the method 700 includes three high-level processes at the base station: (1) configuration on the set of UE preferred radio resources at step 710; (2) Prepare to handle the RRI report from step 715 to step 725; and (3) Schedule for UEs served by the eNB at step 730. The process starts at step 705. At step 710, the serving eNB configures the sets of UE preferred radio resources. The configuration information can be made known to all or at least some UEs in the serviced cell. At decisional step 715, the serving eNB determines whether new neighboring cells are reported by the in-cell UEs. If the serving eNB receives a measurement report indicating one or more new neighboring cells have been found by a UE, the serving eNB can proceed to step 720 where it may pass UE information to the found neighboring eNB to register the UE, since the UE may be interfered by the neighboring eNB. Next, the serving eNB decodes the RRI reports at step 725. If no new neighboring cell is reported by the UE, the serving eNB directly proceeds to step 725 from step 715. At step 725, the serving eNB may decode one or more RRI reports from one or more in-cell UEs and/or registered UEs in the neighboring cells. In some implementations, one or more UEs may send RRI reports to their serving eNB only when they experience relatively strong interference from neighboring eNBs. For those UEs, their UE information may have been communicated to one or more interfering eNBs to enable those eNBs to decode RRI reports even if those RRI reports are directed towards the serving eNB. In some implementations, the serving eNB may not receive all or at least some the RRI reports. However, since the number of sets of UE preferred radio resources for each cell is limited, the successful decoding of one or more RRI reports may result in sufficient information for the inter-cell interference coordination. Various implementations may include the following feature. The UE may not send a specific report to each of the neighboring eNBs, for the purpose of saving the UE's energy and reducing the inter-cell interference in the uplink. The neighboring eNBs may just eavesdrop on the UE reports that are sent to the serving eNB. At step 730, a serving eNB can perform downlink scheduling with the following information: (1) preferred radio resources in the RRI reports from in-cell UEs; and (2) transmit power change limits over the preferred radio resources in the RRI reports from neighboring-cell UEs. In some implementations, a UE can report a CQI and a preferred radio resource set with the current interference power level considered and with a transmit power change limit of 0 dB, which may indicate a data rate the UE can handle if the neighboring eNBs maintain the same transmit power in their recent scheduling history.

Figure 8A:
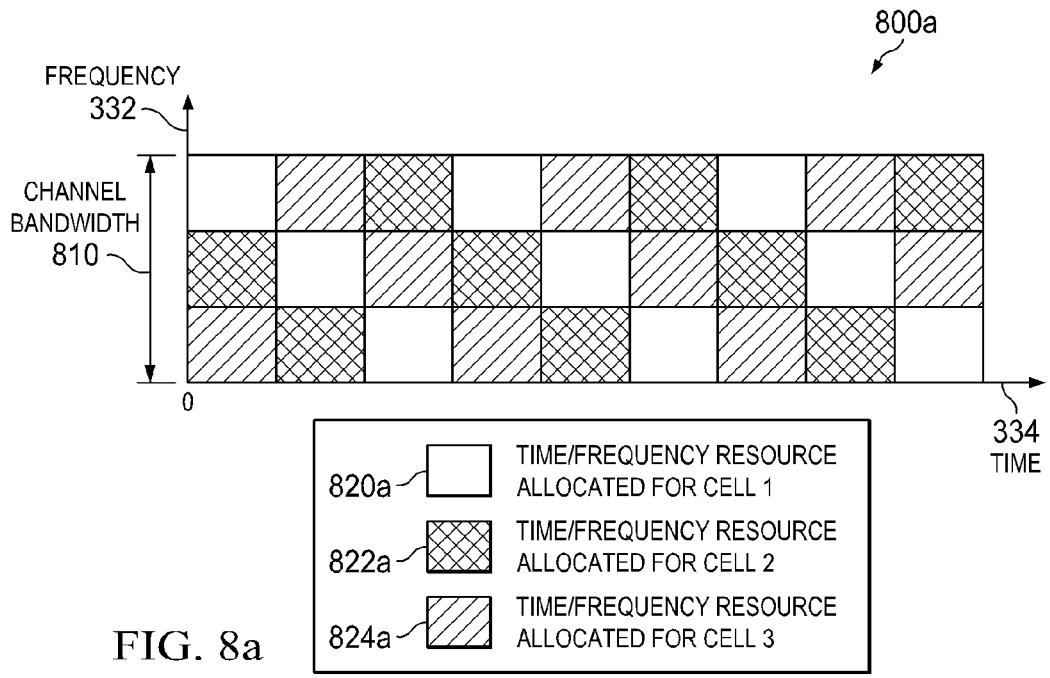
FIG. 8a-b are example downlink radio resource reuse configurations at the base station.
Figure 8B:
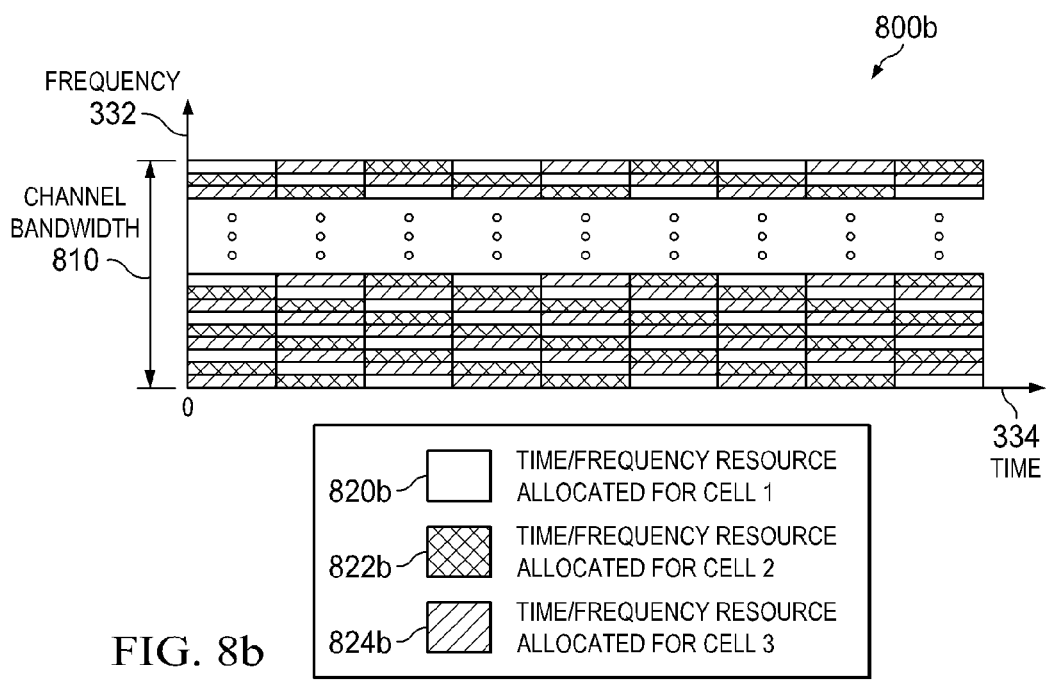

Turning to the preferred radio resources configuration process at the eNB, one or more sets of radio resources for reuse among neighboring eNBs can be determined by the serving eNB. Two of the various implementations are illustrated in FIGS. 8a and 8b. FIG. 8a is an example downlink radio resource reuse configuration at the base station, where a high-level set of radio resources for the resource reuse among cells is determined. Then each eNB can derive subsets from a given high-level set if there is a use. In this example, a 3-cell system is considered, frequency 332 and time 334 resource blocks 820a, 822a and 824a are allocated to cells 1, 2 and 3, respectively. It is assumed that there is one antenna beam for one cell and the entire frequency bandwidth of the system 810 is partitioned into three subbands. Further, within each subband, the radio resource blocks are contiguously allocated to each of the cells. In other words, there is one set of radio resources for one cell at one time. Therefore, all or at least some interference-experiencing UEs in the same cell can specify and share one set of radio resources. FIG. 8b is an example downlink radio resource configuration where the frequency resources within one set are interleaved or distributed. In some implementations, the wireless channel may experience frequency selective fading, where the channel gain may vary significantly across different frequencies. It may be useful to equally spread frequency resources across the entire frequency bandwidth 810 of interest. Similar to FIG. 8a, a 3-cell system is considered in this example, frequency 332 and time 334 resource blocks 820b, 822b and 824b are allocated to cells 1, 2 and 3, respectively. Further, all or at least some interference-experiencing UEs in the same cell may specify and share one set of radio resources. In some implementations, it is possible that from a high-level set of radio resources, each eNB can derive multiple subsets with different methods of frequency and time multiplexing such that interference-experiencing UEs can specify different subsets to use. If there is no conflict (i.e., no UEs competing for the same subset), the eNB may do the scheduling by following the indications of the UEs. If there is a conflict, the UEs can share the same subset of radio resources and/or they can use a reserved set of radio resources which may be applicable in some implementations. In some implementations, the downlink frequency resources used by UEs in one cell can hop from one time unit to another.

Turning to the transmit power change limit, the eNBs can identify one or more power change limit levels for the UEs to select from. In some implementations, to make the RRI configuration known to the in-cell UEs, broadcasting can be performed by the serving eNB as the information to be delivered can be common to the UEs. In some implementations, the eNB may also send substantially similar configuration information to each in-cell UE.

Turning to the process of decoding RRI reports at the eNBs, in some implementations, the eNBs may be aware of the upcoming downlink scheduling at their neighboring cells, so they can effectively coordinate downlink inter-cell interference. Further, the eNBs may want to receive the downlink scheduling information as early as possible. In some implementations, the eNBs can exchange their scheduling information via the X2 interface. However, exchanging scheduling information via the X2 interface may result in a non-trivial latency. In a particular implementation, the RRI reports from one or more UEs can be decoded by all or at least some eNBs (i.e., including the serving eNB and neighboring eNBs). It should be noted that as mentioned above, the reports from different UEs are sent to their respective serving eNBs, and the serving eNBs can use these reports as part of their guidance on their upcoming downlink scheduling.

In some implementations, it is possible for a neighboring eNB to decode the RRI reports sent from one or more UEs to their respective serving eNB. One particular implementation is illustrated as follows.

A UE may send a measurement report associated with the downlink signal from the neighboring cell to its serving eNB if a new neighboring cell is found. Next, the serving eNB can communicate with the neighboring cell to register the UE to the neighboring cell. The registration may include the expected time of arrival (TOA) of the UE RRI report, its reporting pattern and/or any other UE information. The registration information may be used by the neighboring eNB to decode the RRI report from the UE. The serving eNB may also notify the neighboring eNBs for the neighboring UE deregistration or may periodically notify the neighboring eNBs to reconfirm the neighboring UE registration. A UE registration that is not reconfirmed may expire and/or be deleted. In some implementations, an X2 message for the registration to neighboring eNBs may be required. The X2 message can be used for providing information about a UE to a neighboring eNB to help the neighboring eNB decode the RRI report from the UE. For example, an expected time of arrival of a UE RRI report at a neighboring eNB may be included in the X2 message. In a time-synchronous network, the expected TOA can be calculated by adding the downlink time difference reported by the UE to the TOA decoded by the serving eNB from the RRI report. In a non-time-synchronous network, the time difference between eNBs may be subtracted from the time difference reported by the UE before the calculation of the expected TOA. In some implementations, a scrambling code similar to the CDMA uplink scrambling code (e.g., a Gold code) can be used to generate the RRI report. Further, the scrambling code is a combination of the serving cell ID for the UE and the C-RNTI assigned to that UE. Then the serving cell ID and the assigned C-RNTI may also be included in the X2 message.

An example assignment of bits to the registration information may be as follows: (1) 10 bits for TOA up to 1 ms at a resolution of 1 μs; (2) 10 bits for cell ID; and (3) 16 bits for C-RNTI. In some implementations, the resolution of TOA may be from 1 us to 8 us, and multiple UEs may be reported with the same TOA in an X2 message, so that the repeated bits on TOA and cell ID may be saved.

In some implementations, the X2 message in the present disclosure may not be time critical, i.e., it can tolerate the communication latency between eNBs, and the X2 message may be sent based on use. The X2 message may be used to enable a neighboring eNB to decode an RRI report from a neighboring UE for the first time. Afterwards, the neighboring eNB may be able to track the TOA of RRI reports and the X2 message may not be updated.

In some implementations, each eNB may decode UE RRI reports from the UEs it serves and the registered UEs in the neighboring cells. Various implementations of decoding RRI reports may include: (1) for UEs that experience strong downlink signals from neighboring eNBs, it is to be understood that their uplink signals may appear at neighboring eNBs with a strong signal power; hence may be easy to decode; (2) for uplink signals from neighboring cells that may not be synchronous to the in-cell uplink signals, they may still be decodable with proper design. For example, spreading and scrambling of a UE RRI report with a UE-specific code may result in a decodable report at an eNB, if the UE-specific code is revealed to the eNB. The UE-specific code can be made available at the eNB through the registration of the corresponding neighboring cell UE; (3) eNBs may exchange the decoded information of UE RRI reports between each other, so that the eNBs may not decode directly the UE RRI reports from neighboring cell UEs. However, in some implementations, a direct decoding approach may be performed, since it may be faster and may incur no backhaul burden.

Figure 9:
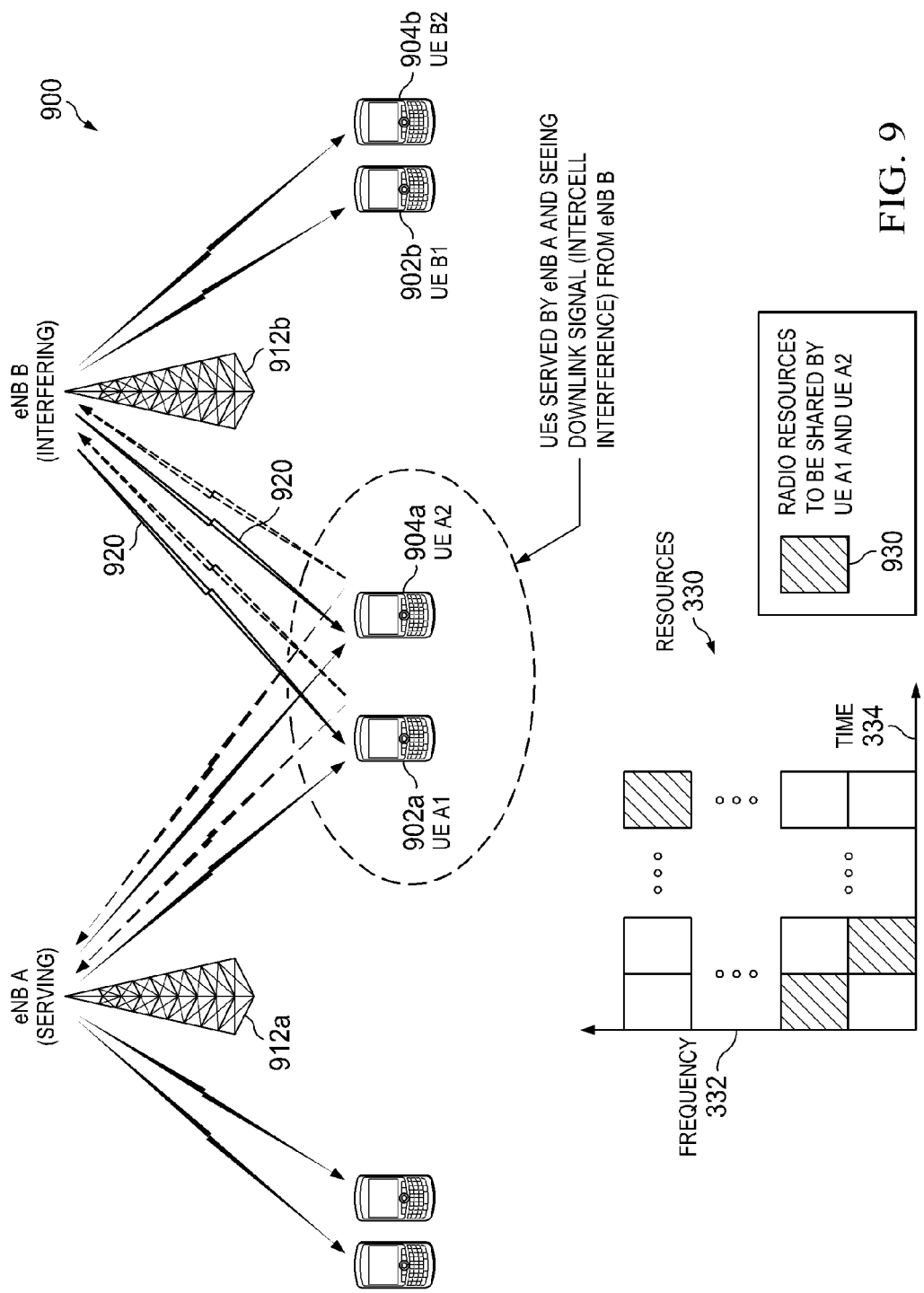
FIG. 9 is an example illustration of decoding a user report for interference mitigation.

FIG. 9 is an example illustration of decoding UE RRI reports for interference mitigation. The UE RRI reports can be decoded at the eNBs. In this example 900, UE A1 902a and UE A2 904a are served by eNB A 912a and they receive inter-cell interference 920 from neighbor eNB B 912b. Accordingly, UE A1 902a and A2 904a can send RRI reports to eNB A 912a to indicate, for example, a set of radio resources 930 to use in the upcoming time interval. Once eNB A 912a decodes the RRI reports, it can schedule UE A1 902a and UE A2 904a to share the indicated radio resources. Further, eNB B 912b may also decode the RRI reports and schedule for its in-cell UEs, e.g., UE B1 902b and UE B2 904b, to use radio resources different from those indicated by UE A1 902a and UE A2 904a. In some implementations, eNB 912b can use the frequency resources indicated by UE A1 902a and UE A2 904a but with a transmitted power less than or equal to a worst-case transmit power limit level indicated in the RRI reports from UE A1 902a and UE A2 904a.

In some implementations, the uplink signals carrying RRI and PCLI bits sent by UEs in one cell may not be time-synchronized with each other when they arrive at a neighboring eNB. Further, the uplink signals from the UEs may not be time-synchronized with the uplink signals from in-cell UEs in the neighboring cell, which may result in uplink inter-cell interference. More specifically, in the example illustrated in FIG. 9, the uplink signals carrying the RRI reports from UE A1 902a and UE A2 904a may not be time-synchronized with each other when they arrive at eNB B 912b and/or may not be time-synchronized with one or both of the uplink signals from UE B1 902b and UE B2 904b when they have active uplink transmissions. As a result, knowing the time of arrival (TOA) of the RRI reports would help eNBs in decoding those reports. The following method or a combination of methods can be used to estimate the non-synchronized TOA of UE A1 902*a* and UE A2 904*a*: (1) if eNB A 912*a* and eNB B 912*b* are time-synchronized, the TOA of the uplink signals from neighboring cell UEs may not be far away in terms of the cell downlink signal time difference indicated by the measurement reports. Further, if a scrambling code is used to transmit an RRI report, eNB A 912*a* and eNB B 912*b* can descramble the code for timing information; (2) if eNB A 912*a* and eNB B 912*b* are not time-synchronized, eNB B 912*b* may have an approximate estimate on the TOA based on the cell downlink time difference reported in the measurement reports and the initial over-the-air (OTA) round-trip-delay (RTD) information from eNB A 912*a*, if the UE reports that eNB B 912*b* is found. The time uncertainty may then be shifted to the OTA RTD delay difference between the links from eNB A 912*a* and eNB B 912*b* to the UE. Similarly, if a scrambling code is used to transmit an RRI report, eNB B 912*b* can descramble the code for timing information; (3) if an eNB finds the TOA of the RRI report from a UE, the eNB can track the timing change of RRI reports and/or search for a new RRI report around the TOA of the previous RRI report.

In some implementations, the following method or a combination of methods can be used to reduce the uplink inter-cell interference: (1) if an RRI report was sent separately from the existing PUCCH transmission, it may increase the uplink interference. Accordingly, it is to be understood that the reduced transmit power may alleviate the uplink inter-cell interference. If an RRI report is embedded in a PUCCH transmission, it may not affect the uplink inter-cell interference, since PUCCH is required to be transmitted by the 3GPP LTE standard; (2) the eNB can reserve subbands for its cell-edge UEs. Returning to the example illustrated in FIG. 9, the uplink signals from UE A1 902*a* and UE A2 904*a* may not use the same subband as the cell-edge UEs served by eNB B 912*b*. However, they may use the same subband as the cell-center UEs served by eNB B 912*b*. Since the uplink signals from the cell-center UEs may be strong as seen by the serving base station, those uplink signals may be decoded reliably even in the presence of uplink inter-cell interference. In some implementations, eNB B 912*b* can first decode the uplink signals from its cell-center UEs, reconstruct the encoded received uplink signals from those UEs, and subtract those interfering signals from the overall received signal before decoding the RRI reports from neighboring cell UEs.

In some implementations, the eNB B 912*b* may not decode the RRI reports from neighboring cell UEs. Instead, the eNB B 912*b* can rely on the RRI decoding results relayed from eNB A 912*a* relayed via the backhaul infrastructure of the LTE system.

Turning to the scheduling of the in-cell UEs by the serving eNB, in some implementations, the eNB can first determine a timer, e.g., "T_RRI" subframes, for the effective time interval of RRI reports. In some implementations of the LTE system, the length of one subframe is 1 ms. The eNB may use the UE-specified preferred set of radio resources to schedule data transmissions to the UEs within next "T_RRI" subframes. Multiple UEs may share the radio resources if there is a conflict. Frequency selective scheduling for the UEs which experience slow fading channels may also be performed. However, frequency selective scheduling may be restricted within the specified preferred radio resources. If the RRI-reporting UEs cannot use up the preferred set of radio resources, the left-over radio resources may be used by the UEs who have not reported any RRI. If the UEs do not specify any preferred radio resources, all or at least some radio resources can be used. However, the transmit power of the eNB on the preferred radio resources of the neighboring cell UEs may be limited within the next "T_RRI" subframes according to the RRI report received. After the "T_RRI" subframes, if there is no UE RRI report received, the eNB can schedule freely.

In a particular implementation, if all or at least some UEs are not in the cell-edge region of a LTE system, they may not receive any inter-cell interference. Accordingly, those UEs may not send an RRI report for scheduling and/or specify the transmit power change limit. Therefore, as discussed above, all or at least some eNBs can schedule freely. In some implementations, it may be possible that all or at least some cells are heavily loaded and each eNB can use a high transmit power to send high quadrature amplitude modulation (QAM) signals. In some implementations, if the UEs do not report any inter-cell interference, the frequency reuse measure may not be triggered at the eNBs.

Figure 10:
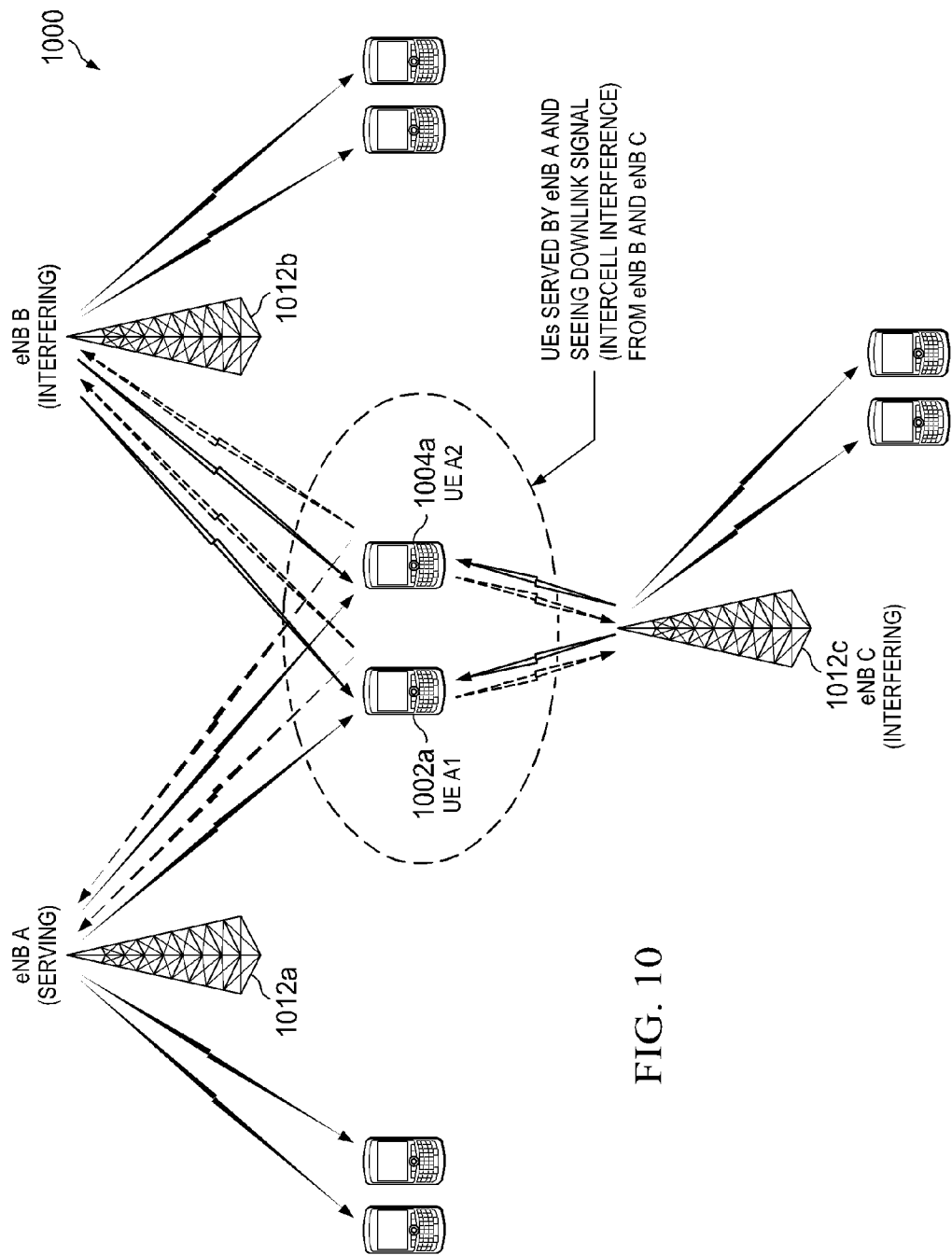
FIG. 10 is an example three-cell cellular network with one cell having users located at the cell-edge.

FIG. 10 is an example three-cell cellular network with one cell having users located at the cell-edge. The downlink interference coordination method of this example cellular network can be illustrated as follows. UE A1 1002*a* and UE A2 1004*a* are served by eNB A 1012*a* and they are located at the cell-edge of the serving area of eNB A 1012*a*, eNB B 1012*b* and eNB C 1012*c*. In this implementation, UE A1 1002*a* and UE A2 1004*a* may receive inter-cell interference from eNB B 1012*b* and eNB C 1012*c* and trigger an RRI report. The RRI report can be associated to the preferred radio resources requested from eNB A 1012*a* and the transmit power change limit requested from eNB B 1012*b* and eNB C 1012*c*. After the RRI report is received, the eNB A 1012*a* can schedule the preferred radio resources for UE A1 1002*a* and UE A2 1004*a*. eNB A 1012*a* may also schedule freely the rest of the radio resource for other UEs from which it did not receive RRI reports. If the preferred radio resources are more than UE A1 1002*a* and UE A2 1004*a* requested, the unused preferred radio resources may be used by other in-cell UEs.

eNB B 1012*b* and/or eNB C 1012*c* can know the transmit power limit on the preferred radio resources specified by UE A1 1002*a* and/or UE A2 1004*a* by decoding their respective RRI report. Therefore, eNB B 1012*b* and eNB C 1012*c* can restrict their transmit power in accordance with the decoded information of the RRI report. eNB B 1012*b* and eNB C 1012*c* may also schedule freely the rest of their radio resources for other in-cell UEs from which they did not receive RRI reports. Further, in some implementations, the constraints on the preferred radio resources and the transmit power change limit expire after "T_RRI" subframes.

Figure 11:
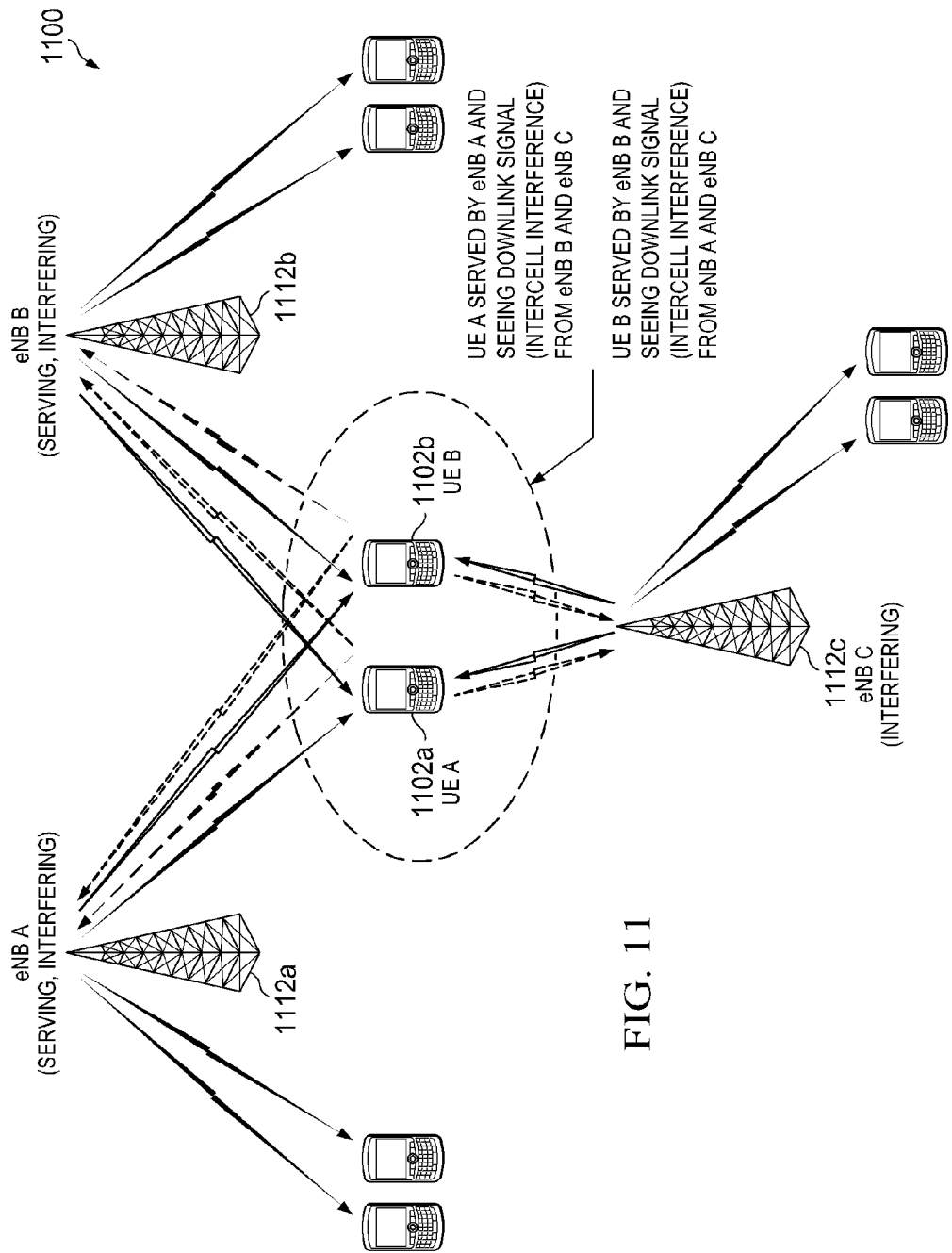
FIG. 11 is an example three-cell cellular network with two cells having users located at the cell-edge.

FIG. 11 is an example three-cell cellular network with two cells having users located at the cell-edge. The downlink interference coordination method of this example cellular network can be illustrated as follows. Similar to the example shown in FIG. 10, a three-cell system 1100 is considered. UE A 1102*a* is served by eNB A 1112*a*, UE B 1102*b* is served by eNB B 1112*b*. UE A 1102*a* and UE B 1102*b* are located at the cell-edge of the serving area of eNB A 1112*a*, eNB B 1112*b* and eNB C 1112*c*. In this implementation, UE A 1102*a* may receive inter-cell interference from eNB B 1112*b* and eNB C 1112*c*, and trigger an RRI report. The RRI report can be associated to the preferred radio resources requested from eNB A 1112*a* and the transmit power change limit requested from eNB B 1112*b* and eNB C 1112*c*. Similarly, UE B 1102*b* may receive inter-cell interference from eNB A 1112*a* and eNB C 1112*c* and trigger an RRI report. This RRI report can be associated to the preferred radio resources requested from eNB B 1112*b* and the transmit power change limit requested from eNB A 1112*a* and eNB C 1112*c*. In some implementations, the sets of preferred radio resources can be predetermined to avoid overlapping across different neighboring cells. After decoding the respective RRI reports from UE A 1102*a* and UE B 1102*b*, eNB A 1112*a* can schedule the preferred radio resources indicated by UE A 1102*a* and schedule the transmit power limit on the preferred radio resources indicated by UE B 1102*b*. Further, after decoding the respective RRI reports from UE B 1102*b* and UE A 1102*a*, eNB B 1112*b* can schedule the preferred radio resources indicated by UE B 1102*b* and schedule the transmit power limit on the preferred radio resources indicated by UE A 1102*a*. If the preferred radio resources are more than UE A 1102*a* and/or UE B 1102*b* requested, the unused preferred radio resources may be used by other in-cell UEs.

eNB C 1112*c* can know the transmit power limit on the preferred radio resources specified by UE A 1102*a* and/or UE B 1102*b* by decoding their respective RRI report. Therefore, eNB C 1112*c* can restrict its transmit power in accordance with the decoded information of the RRI reports. eNB C 1112*c* may also schedule freely the rest of its radio resources for other in-cell UEs from which it did not receive RRI reports. Further, in some implementations, the constraints on the preferred radio resources and the transmit power change limit expire after "T_RRI" subframes.

In some implementations, the UEs can use one of the existing CQI levels to indicate the preferred radio resource at each particular resource block. In the case when one radio resource indicator is used for one cell, the UE may be able to remove an existing CQI level and use the value corresponding to that level to indicate an on/off function of the preferred radio resource indicator.

In some implementations, to detect the interference level, some recurring silent period can be assigned over time and/or frequency when a neighboring eNB is transmitting a cell-specific reference signal. For example, a multicast broadcast single frequency network (MBSFN) subframe may be scheduled. In an MBSFN subframe, a maximum of two OFDM symbols at the beginning of the subframe may be transmitted and the remaining OFDM symbols, including the embedded cell specific reference signals may not be transmitted. Therefore, during the time portion when no OFDM symbols are transmitted in an MBSFN subframe, there may be no inter-cell interference or little inter-cell interference to the UEs in neighboring cells. Accordingly, when non-MBSFN subframes are transmitted, the inter-cell interference power level can increase, which may be easier for the neighboring cell UEs to detect.

In some implementations, the uplink transmission of RRI reports can be in the physical random access channel (PRACH) resources to coexist with the PRACH signals. Since PRACH signals are robust to inter-cell interference, the impact of RRI transmission on the PRACH detection at an eNB may be negligible.

In some implementations, an eNB can support multiple fixed antenna beams and define preferred radio resource sets on the per beam basis. A serving eNB and its neighboring eNBs may use a beam-switching technique based on the received signal power from the RRI reporting UE to identify the transmit beam (for the serving eNB) and the beam avoidance (for the neighboring eNBs).

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for managing downlink interference, the method executed on a user device, the method comprising:
   receiving, at the user device, an interference, the user device operating in a cell associated with a corresponding serving base station, the interference received from one or more interfering base stations;
   identifying a preferred radio resource set in response to the received interference, wherein identifying a preferred radio resource set includes:
      identifying a channel power of a received signal for a first at least one resource set;
      identifying an interference floor for the first at least one resource set;
      identifying a received interference power from the one or more interfering base stations for the first at least one resource set;
      identifying a relative interference quantity based on the received interference power from the one or more interfering base stations for the first at least one resource set and the interference floor for the first at least one resource set; and
      if the relative interference quantity is more than a first threshold value, identifying the preferred radio resource set as a second at least one resource set; and
   transmitting a preferred radio resource indication to at least the serving base station in response to the received interference, the preferred radio resource indication identifies and requests allocation of preferred radio resources for upcoming downlink transmission from the serving base station.

2. The method of claim 1 further comprising:
   identifying at least one of the one or more interfering base stations; and
   providing to at least the serving base station a measurement report in which the at least one of the one or more interfering base stations is identified in addition to transmitting the preferred radio resource indication.

3. The method of claim 1, wherein the preferred radio resource indication is transmitted, to at least the one or more interfering base stations, as part of an interference coordination report, the interference coordination report further including a transmit power change limit indication.

4. The method of claim 3, wherein the transmit power change limit indication requests the one or more interfering base stations to adjust a transmission power level associated with at least an identified radio resource subset of the preferred radio resource set.

5. The method of claim 3, wherein the transmit power change limit indication requests the one or more interfering base stations to discontinue transmitting on at least an identified radio resource subset of the preferred radio resource set during a defined time period which begins at a defined time, the method further comprising determining an interference floor associated with at least the identified radio resource subset of the preferred radio resource set while the one or more interfering base stations have discontinued transmitting on at least the identified radio resource subset of the preferred radio resource set.

6. The method of claim 1, wherein the preferred radio resource indication is transmitted by the user device to at least one of the one or more interfering base stations.

7. The method of claim 1, wherein the preferred radio resource set includes a plurality of preferred radio resource subsets.

8. The method of claim 7, wherein the preferred radio resource indication identifies at least one of the plurality of preferred radio resource subsets.

9. The method of claim 1, wherein identifying a received interference power from the one or more interfering base stations is based, at least in part, on data active reference signals in signals received, at the user device, from the one or more interfering base stations.

10. The method of claim 1, wherein transmitting a preferred radio resource indication further includes:
  identifying a channel power of a received signal for the second at least one resource set;
  identifying an interference floor for the second at least one resource set;
  identifying a received interference power from the one or more interfering base stations for the second at least one resource set;
  determining a first channel quality indicator value for the second at least one resource set, the first channel quality indicator value based on at least one of the channel power of the received signal for the second at least one resource set, the interference floor for the second at least one resource set, and the received interference power from the one or more interfering base stations for the second at least one resource set; and
  if the first channel quality indicator value is greater than a second threshold value, transmitting a preferred radio resource indication identifying the preferred radio resource set as the second at least one resource set.

11. The method of claim 10, further comprising:
  if the first channel quality indicator value is less than or equal to the second threshold value, calculating a second channel quality indicator value for the second at least one resource set, the second channel quality indicator value determined based on at least the interference floor for the second at least one resource set; and
  if the second channel quality indicator value exceeds a third threshold value, transmitting the preferred radio resource indication identifying the preferred radio resource set as the second at least one resource set and transmitting a transmit power limit change indication requesting the one or more interfering base stations to adjust a transmission power level associated with at least an identified radio resource subset of the second at least one resource set.

12. The method of claim 1, wherein the preferred radio resource set for the serving base station may be different from the preferred radio resource set for at least one of the one or more interfering base stations.

13. The method of claim 1, wherein the preferred radio resource indication is encoded prior to being transmitted to at least the serving base station.

14. The method of claim 1, wherein the preferred radio resource indication is transmitted with a channel quality indication report.

15. The method of claim 1, wherein the interference is received from one or more interfering base stations and one or more devices different from base stations.

16. An apparatus for managing downlink interference, the apparatus operating in a cell associated with a corresponding serving base station and comprising:
  an antenna;
  a memory; and
  at least one hardware processor, the hardware processor operable to execute instructions to:
    receive an interference, the interference received from one or more interfering base stations;
    identify a preferred radio resource set associated with the serving base station in response to the received interference, wherein identify a preferred radio resource set includes:
      identify a channel power of a received signal for a first at least one resource set;
      identify an interference floor for the first at least one resource set;
      identify a received interference power from the one or more interfering base stations for the first at least one resource set;
      identify a relative interference quantity based on the received interference power from the one or more interfering base stations for the first at least one resource set and the interference floor for the first at least one resource set; and
      if the relative interference quantity is more than a first threshold value, identify the preferred radio resource set as a second at least one resource set; and
    transmit a preferred radio resource indication to at least the serving base station in response to the received interference, the preferred radio resource indication requests allocation of preferred radio resources for upcoming downlink transmission from the serving base station.

17. The apparatus of claim 16, wherein the preferred radio resource indication is transmitted as part of an interference coordination report, the interference coordination report further including a transmit power change limit indication.

18. The apparatus of claim 17, wherein the transmit power change limit indication requests the one or more interfering base stations to adjust a transmission power level associated with at least an identified radio resource subset of the preferred radio resource set.

19. The apparatus of claim 16, wherein the apparatus is operable to transmit the preferred radio resource indication to at least one of the one or more interfering base stations.

20. The apparatus of claim 17, wherein the transmit power change limit indication requests the one or more interfering base stations to discontinue transmitting on at least an identified subset radio resource of the preferred radio resource set; the method further comprising determining an interference floor associated with at least the subset radio resource of the preferred radio resource set while the one or more interfering base stations have discontinued transmitting on at least the radio resource subset of the preferred radio resource set.

* * * * *